(12) United States Patent
Alanqari et al.

(10) Patent No.: US 12,735,624 B1
(45) Date of Patent: Sep. 15, 2026

(54) SEALANT COMPOSITIONS COMPRISING RED MUD, SUBTERRANEAN OPERATION FLUIDS THEREOF, AND RELATED METHODS

(71) Applicant: SAUDI ARABIAN OIL COMPANY, Dhahran (SA)

(72) Inventors: Khawlah Alanqari, Dhahran (SA); Abdullah Al-Yami, Dhahran (SA); Abdulaziz Alhelal, Dhahran (SA); Vikrant Wagle, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 19/209,000

(22) Filed: May 15, 2025

(51) Int. Cl.
*E21B 21/00* (2006.01)
*C09K 8/504* (2006.01)
*C09K 8/508* (2006.01)
*E21B 33/138* (2006.01)

(52) U.S. Cl.
CPC .......... *C09K 8/5086* (2013.01); *C09K 8/5045* (2013.01); *E21B 21/003* (2013.01); *E21B 33/138* (2013.01)

(58) Field of Classification Search
None
See application file for complete search history.

(56) References Cited

U.S. PATENT DOCUMENTS 5,911,282 A 6/1999 Onan et al.
8,157,009 B2 4/2012 Patil et al.
9,410,066 B2 8/2016 Ghassemzadeh
9,580,633 B2 * 2/2017 Pfeil .................... C09J 163/00
9,701,885 B2 7/2017 Husein et al.
9,828,293 B2 11/2017 Yadav et al.
10,005,930 B2 6/2018 Reddy
10,081,755 B2 9/2018 Ballard
10,138,405 B2 11/2018 Kulkarni et al.
10,144,858 B2 12/2018 Kennedy et al.
10,428,261 B2 * 10/2019 Sabins .................. C09K 8/426
10,513,579 B2 * 12/2019 Maeda .................... C08K 3/36
2008/0070774 A1 * 3/2008 Shmotev ................ C04B 33/32
501/87
2015/0353831 A1 * 12/2015 Rocktäschel .......... C08K 3/016
507/140
2017/0306211 A1 * 10/2017 Pisklak .................. E21B 33/14
2017/0342786 A1 * 11/2017 Pisklak .................. C09K 8/601
(Continued)

FOREIGN PATENT DOCUMENTS

CN 107840625 A 3/2018
CN 113248792 B 4/2022
(Continued)

*Primary Examiner* — Andrew Sue-Ako

(74) *Attorney, Agent, or Firm* — Vorys, Sater, Seymour and Pease LLP

(57) ABSTRACT

Sealant compositions and methods of use thereof. Sealant compositions may consist essentially of: a red mud; at least one epoxy resin; optionally, at least one diluent; at least one curing agent; optionally, at least one curing accelerator and/or curing retarding agent; optionally, an emulsifier; and optionally, a weighting agent. Methods of use of sealant compositions may comprise: introducing into a wellbore within a subterranean formation the sealant composition; and allowing the sealant composition to cure to form a solidified sealant composition.

11 Claims, 4 Drawing Sheets

(56) References Cited

U.S. PATENT DOCUMENTS

| | | | | |
|---|---|---|---|---|
| 2019/0008749 | A1* | 1/2019 | Harris | A61K 8/731 |
| 2021/0292231 | A1* | 9/2021 | Alanqari | C04B 14/041 |
| 2022/0267664 | A1* | 8/2022 | Al-Safran | C09K 8/508 |
| 2023/0295484 | A1* | 9/2023 | Al-Safran | C09K 8/426 |

FOREIGN PATENT DOCUMENTS

| | | | |
|---|---|---|---|
| CN | 114479359 | A | 2/2023 |
| WO | 2016043979 | A1 | 3/2016 |

* cited by examiner

SEALANT COMPOSITIONS COMPRISING RED MUD, SUBTERRANEAN OPERATION FLUIDS THEREOF, AND RELATED METHODS

FIELD OF THE DISCLOSURE

The present disclosure relates generally to sealant compositions, subterranean operation fluids thereof, and related methods; more particularly, the present disclosure relates to sealant compositions comprising an epoxy resin system and red mud, subterranean operation fluids thereof, and related methods.

BACKGROUND

The production of crude oil and other hydrocarbons begins with the drilling of a wellbore through a subterranean formation and into a hydrocarbon reservoir. Drilling of a wellbore generally involves circulating a drilling fluid (or drilling mud) from a surface location of the wellbore to a downhole location through a drill string. The drilling fluid exits through ports (or jets) in a drill bit, which bores through the formation and forms the wellbore. The drilling fluid aids in cooling and lubricating the drill bit and further picks up cuttings and carries the cuttings up an annulus (also referred to herein as an annular area) formed between an inner wall of the wellbore and an outer wall of the drill string. The drilling fluid and the cuttings flow through the annulus to the surface, where the cuttings are separated from the fluid. For various environmental, sustainability, and practical reasons, aqueous-based drilling fluids may be preferred for wellbore drilling operations in place of oil-based fluids.

Once the wellbore, or a desired section of a wellbore is complete, it may be isolated from the surrounding subterranean formation using a cementing operation. After drilling, the drill string is replaced by casing, essentially a pipe that creates a central area for flow of liquids with an annulus between the outer wall of the casing and the surrounding formation wellbore walls. During a cementing operation, a cement sheath is placed within that annulus between the subterranean formation and the outer wall of the casing. The cement sheath is formed by pumping a cement slurry down into the casing interior, out through the bottom end of the casing, and up into the annulus between the exterior casing wall and the formation face of the wellbore (known as reverse cementing). The cement slurry then cures in the annular space, thereby forming a sheath of hardened cement that, among other functions, supports and positions the casing in the wellbore and bonds the exterior surface of the casing to the subterranean formation. The cement also prevents hydrocarbon fluid from flowing uphole from a hydrocarbon producing zone to the surface and in the annulus between the casing and the wellbore wall. Without the cement, or in instances when cement has failed, hydrocarbons are known to migrate to the surface and then present a safety hazard to operations personnel.

Cement slurries used in the oil and gas industry include primary, remedial, squeeze, and plug cementing techniques to place cement sheaths, for instance, in an annulus between a tubular (e.g., a casing) and a wall of the wellbore, for well repairs, well stability, or for well abandonment (i.e., sealing an old well to eliminate safety hazards). These cement slurries should be able to consistently perform throughout operations (e.g., pumping) and over a wide range of temperatures and conditions as cement cure in an oil and gas well may be vulnerable to radial stresses imposed by pressure and temperature fluctuations. Such vulnerability, depending on its severity, can result in mechanical failure. After mechanical failure, an expensive remedial operation like squeezing resin or micro-cement may be required to repair cracks in the wellbore cement sheath. Inadequate sealing of the original cracks or inadequate remedial operations may cause a fire hazard, an environmental hazard, a lack of zonal isolation, or a loss of pressure behind casing. Depending on the severity, these risks may lead to catastrophic accidents, failures, or well abandonment.

The transition between a drilling operation and a cementing operation may further result in various issues that require additional remedial steps, such as for example, operator costs associated with time, economic expenditures, and equipment wear and tear. For example, after performing a drilling operation, residual aqueous-based drilling fluid may remain within the drilled wellbore, presenting significant challenges related to, for example, zonal isolation due to unstable and/or poor cement bonding, mud channeling, or other fluid migration-related interferences.

Indeed, fluid loss (or lost circulation) is a common way that drilling fluid is lost into the surrounding subterranean formation. Fluid loss can occur in various subterranean formations, such as naturally fractured formations, cavernous formations, and highly permeable formations (e.g., formations having a permeability greater than 500 millidarcy), regardless of the wellbore geometry (e.g., horizontal, vertical, deviated, or otherwise tortuous). While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can be categorized by the amount of fluid or mud lost as seepage type, moderate type, severe type, and total loss. The extent of the fluid loss and the ability to control the lost circulation using lost circulation materials ("LCMs") depends on the formation type where lost circulation occurs. One method that has been developed to control lost circulation involves the placement of LCMs into a lost circulation zone (i.e., the sections of a formation into which drilling fluid may be lost). Conventional LCMs may include fibrous, lamellated or granular materials. For a number of reasons, use of LCMs may not provide a desirable level of lost circulation control in all circumstances.

In view of the aforementioned, a need exists for an ecologically and economically friendly sealant system for use in the oil and gas industry with improved fluid loss control and/or cement sheath stabilization during subterranean operations.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, sealant compositions are provided, consisting essentially of: a red mud; at least one epoxy resin; optionally, at least one diluent; at least one curing agent; optionally, at least one curing accelerator and/or curing retarding agent; optionally, an emulsifier; and optionally, a weighting agent.

According to an embodiment consistent with the present disclosure, methods of use of sealant composition are provided, comprising: introducing into a wellbore within a subterranean formation a sealant composition consisting essentially of: red mud; at least one epoxy resin; optionally, at least one diluent; at least one curing agent; optionally, at least one curing accelerator and/or curing retarding agent; optionally, an emulsifier; and optionally, a weighting agent; and allowing the sealant composition to cure to form a solidified sealant composition.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A shows a schematic illustration of loss zones within a subterranean formation wherein the loss events can possibly occur, e.g., through natural fractures. FIG. 1B shows a schematic illustration of a subterranean formation in which an epoxy resin system-red mud-based sealant composition is formed within a loss zone for use as a lost circulation material.

DETAILED DESCRIPTION

Figure 1A:
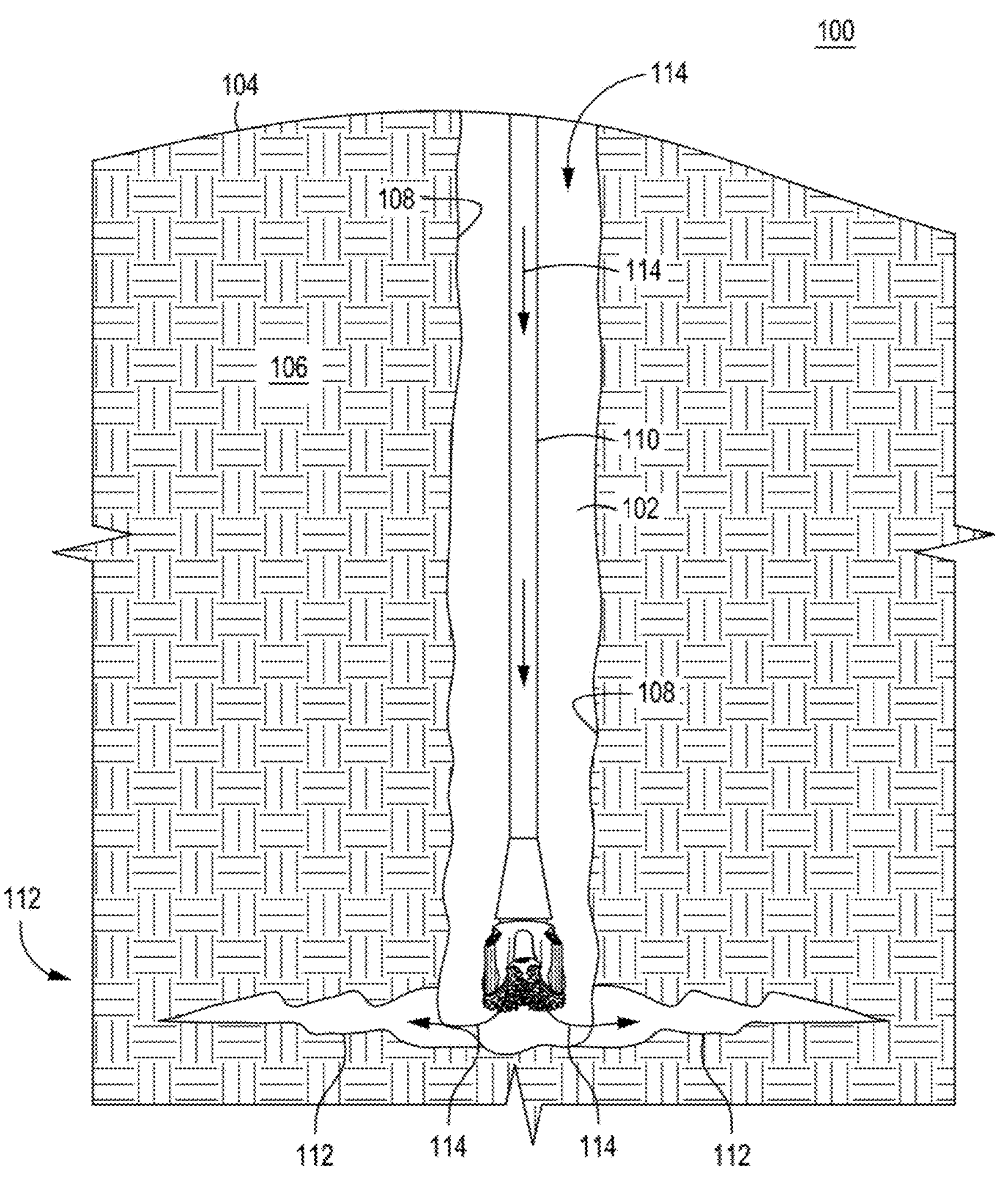
FIGS. 1A-1B show a schematic illustration of losses due to fractured substrate formation by which the loss of drilling fluid can take place, as described below in the Examples.

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figure may vary without departing from the scope of the present disclosure.

Embodiments of the present disclosure generally relate to preventing lost circulation during well drilling or cementing operations. The materials described as suitable for use herein to provide stable masses that are suitable for preventing lost circulation during drilling and for providing a stable cement sheath that seals the outer wall of the casing to the walls of the drilled wellbore.

In an aspect, the present disclosure provides improved sealant compositions and related methods for mitigating fluid flow into lost circulation zones within a subterranean formation, where the sealant is capable of acting as a lost circulation material ("LCM"), during drilling operations, cementing operations, the like, and any combination thereof. In an embodiment, the sealant compositions are suitable for sealing formations having different types of fractures. Sealant compositions as disclosed herein provide an improved, environmentally acceptable, customized high-performance system that can be used in water-based mud systems and oil-based mud systems, enabling wells to be drilled with high pressure high temperature wells, while reducing fluid loss into subterranean formations.

In a further aspect, the present disclosure provides sealant compositions and related methods for forming cement sheaths within an annulus of a wellbore, during primary, remedial, squeeze, or plug cementing techniques, the like, or any combination thereof. Sealant compositions as disclosed herein can further be used as cement slurries, to position and stabilize a casing within a wellbore, while preventing the flow of fluids between formations, between a formation and the surface, as well as preventing gas or fluids from migrating to the surface. This newly designed system helps the operator increase operational efficiency by minimizing the risk of differential sticking, reducing downhole losses, improving wellbore stability, and reducing the cost of chemical usage, while also being an eco-friendly material.

As used herein, the term "subterranean formation," and grammatical variants thereof, refers to naturally occurring rock beneath the Earth's surface, including subsea surfaces. As used herein, the terms "formation matrix," "matrix," and grammatical variations thereof, refer to the variety of natural rock which makes up a subterranean formation, including, but not limited to, carbonate-based rock (e.g., calcium carbonate ($CaCO_3$)), calcium magnesium carbonate ($CaMg(CO_3)_2$) (also referred to as dolomite), sandstone-based rock comprising clays (e.g., smectite, illite, kaolinite, chlorite, and the like), each of which include minerals (e.g., siliceous material) the like, and any combination thereof. The subterranean formations described herein encompass reservoir zones (i.e., zones comprising hydrocarbons, also referred to herein as "hydrocarbon reservoirs") and non-reservoir zones (i.e., zones that do not include hydrocarbons, such as water-producing zones).

As used herein, the terms "subterranean operation" and "upstream operation," and grammatical variants thereof, refer to any operation (e.g., drilling, completion, stimulation, enhanced recovery, production, and waste storage) involved in production of petroleum, natural gas, as well as other resources, such as water or helium, from a subterranean formation. A subterranean formation may contain an existing injection well, an existing production well, or a deep abandoned shallow single and/or multi-lateral well.

As used herein, the terms "well," "wellbore," and grammatical variants thereof, refer to a drilled hole or borehole penetrating a subterranean formation, which may be cased (cemented) or uncased (open hole). A wellbore may be of any geometry, including vertical, horizontal, deviated, or otherwise tortuous.

As used herein, the term "downhole," and grammatical variants thereof, refers to the subsurface point of greatest penetration or depth in a wellbore.

As used herein, the term "subterranean operation fluid," and grammatical variants thereof, refers to gaseous fluids, aqueous or oil-based liquids, and/or aqueous or oil-based muds suitable for use in subterranean operations in subterranean formations. For example, a drilling operation may use a liquid-based or mud-based drilling fluid, a cementing operation may use a cement slurry, a fluid loss control operation may use a liquid-based or mud-based drilling fluid or a drilling pill, or an enhanced recovery operation may include a fracturing fluid.

As used herein, the term "lost circulation zone," and grammatical variants thereof, refers to a location within a wellbore in which fluid loss occurs into a subterranean formation. A lost circulation zone may encompass an area encountered during various subterranean formation operations (e.g., drilling operations, cementing operations) where a volume of a treatment fluid is imbibed by a subterranean formation through a wellbore wall. A rate of loss of 1 to 10 barrels per hour (bbl/h) is characterized as seepage-loss that may occur in any formation; a rate of loss of 10 to less than 500 bbl/h is characterized as moderate-loss that may occur in porous formations or those having relatively small natural or induced fractures; and a rate of loss of equal to or greater than 500 bbl/h is characterized as severe-loss that may occur in highly permeable formations or those having relatively large natural or induced fractures. Severe-loss may include total fluid loss and can result in complete abandonment of a well.

As used herein, the term "formation temperature conditions," and grammatical variants thereof, refer to downhole temperature conditions, i.e., temperature conditions of from 49° C. (120° F.) to about 204° C. (400° F.), including all temperature values and subranges therebetween (e.g., at least about 66° F. (150° F.), at least about 93° C. (200° F.), at least about 121° C. (250° F.), at least about 149° C. (300° F.), or at least about 177° C. (350° F.), or from about 66° F. (150° F.) to about 177° C. (350° F.), or from about 93° C. (200° F.) to about 149° C. (300° F.), or from about 121° C. (250° F.)).

Sealant Compositions

Sealant compositions of the present disclosure may incorporate at least two main components: (i) an epoxy resin system comprising: an epoxy resin portion comprising at least one epoxy resin, and a curing agent portion comprising at least one curing agent; and (ii) a red mud. The epoxy resin portion may further comprise at least one diluent. The curing agent portion may further comprise at least one curing additive. Sealant compositions may further comprise at least one emulsifying agent, weighting agent, the like, or any combination thereof, for example, as part of the epoxy resin system. Sealant compositions of the present disclosure comprise at least one epoxy resin, at least one curing agent, and a red mud. Sealant compositions may exclude an aqueous carrier fluid. Sealant compositions of the present disclosure may comprise a non-aqueous carrier fluid. Sealant compositions may exclude an alkaline silicate, e.g., an alkali metal silicate. Sealant compositions of the present disclosure may consist of or consist essentially of the epoxy resin system and the red mud.

Sealant compositions may be flowable upon activation for a sufficient time, e.g., a sufficient time for pumping of said sealant compositions and/or for use of said sealant compositions for drilling operations, cementing operations, for fluid loss control operations, the like, and any combination thereof. Sealant compositions of the present disclosure may be flowable for a sufficient time, e.g., suitable for pumping, use during drilling operations in a wellbore, use during cementing operations, use during fluid loss control operations, use during enhanced recovery operations, the like, and any combination thereof. After a sufficient time, sealant compositions of the present disclosure may be cured to a semi-solid or solid state capable of sealing lost circulation zones in a subterranean formation, cementing the annulus of the wellbore, or any combination thereof.

As used herein, the terms "flowable," "flowability," and grammatical variants thereof, refer to the ability of sealant compositions of the present disclosure to be pumped and to flow into a wellbore, as required for use as a drilling fluid, a cementing fluid, the like, or any combination thereof. As used herein, flowable sealant compositions are characterized as having a flowable liquid-phase that may include various solid and/or gaseous states of matter dispersed throughout which flow with the flowable liquid-phase. The flowability of sealant compositions can be determined by measuring various rheological properties of the sealant compositions.

Flowable sealant compositions of the present disclosure may be in an inactivated state. As used herein, the terms "inactivated" or "inactivated state," and grammatical variants thereof, refer to sealant compositions of the present disclosure in which substantial curing or other polymerization reactions have yet to occur, either by prevention of contact between the one or more curing agents with any other components of the sealant composition or by addition of one or more cure retarding agents capable of preventing, delaying, or inhibiting a curing reaction or other polymerization reactions therein, or for which, after contact has been made between the one or more curing agents and the other components of a sealant composition, insufficient time has passed, such that substantial curing or other polymerization reactions have not occurred. As used herein, the term "substantial," and grammatical variants thereof, generally refer to an amount of curing or other polymerization reactions that produce a change of greater than 5 percent (%) in any property (e.g., weight percent (wt %), rheology, density, the like, or any combination thereof). For example, a property of any component of sealant compositions will refer to the property prior to contact with any curing agents, while a property of sealant compositions, unless otherwise indicated, refers to the property of an inactivated sealant composition (i.e., the property as measured immediately after addition of the curing agent and before substantial curing has occurred).

As used herein, the terms "activated" and "activated state," and grammatical variants thereof, refer to sealant compositions of the present disclosure in which a substantial curing reaction has occurred within sealant compositions by contact between any curing agents and the other components of the sealant composition, and/or by loss, removal, and/or inhibition of any cure retarding agents, and/or by addition of one or more accelerators capable of accelerating the setting reaction, and/or by subjecting an inactivated sealant composition to heat (e.g., at room temperature or above, e.g., at 100° F. or above, at formation temperature conditions (e.g., from about 120° F. to about 400° F.) or above).

Sealant compositions of the present disclosure may undergo various curing reactions. As used herein, the terms "cure," "curing," and grammatical variations therein, generally refer to reactions between epoxy-functional materials (i.e., epoxy-functional resins, epoxy-functional diluents, and any combination thereof) and co-reactants (e.g., materials comprising hydroxyl groups, amine groups, carboxylic acids, thiols, and the like) which undergo crosslinking upon initiation with curing agents, which may or may not become part of the cross-linked structure. Curing of sealant compositions of the present disclosure may comprise a first transition from the flowable liquid-phase to a thickened-phase. As used herein, the term "thickening time," and grammatical variants thereof, generally refers to the duration of time that sealant compositions remain in a fluid state capable of being pumped (i.e., flowable). With time, sealant compositions undergo a second transition from the intermediate thickened-phase to a semi-solid phase (also referred to herein as a semi-solid state). As used in this disclosure, the term "semi-solid" refers to a phase (aka, state) of the sealant compositions that is between a liquid material and a solid material in which the composition exhibits high elasticity and flexibility. In the semi-solid state, sealant compositions may be easily deformed but may return to shape upon releasing the deforming force.

With more time, cured sealant compositions may undergo a third transition into a solid phase (also referred to herein as a solid state). As used herein, the term "solid," and grammatical variations thereof, generally refers to a state of the sealant compositions that is a rigid material in which the composition exhibits zero or negligible deformation. As used herein, the term "solidified sealant compositions," and grammatical variants thereof, refer to any of the cured phases (either the elastic semi-solid or the rigid solid phases) that form after activation of sealant compositions of the present disclosure. As used herein, the terms "setting time," "curing time," and grammatical variations thereof, refer to the duration of time for sealant compositions to form solidified sealant compositions (e.g., either the semi-solid or the solid phases). A solidified sealant composition of the present disclosure (also referred to herein as a cured or a set sealant composition), whether an elastic semi-solid or a rigid solid, may be suitable for sealing an annulus of a wellbore, for sealing lost circulation zones within a subterranean formation, the like, or any combination thereof.

Red Mud

Red mud of the present disclosure may be added to the sealant compositions described herein to act as a weighting material in the sealant composition, and to aid the sealant composition in forming a rigid material with the epoxy resin system therein. As used herein, the term "red mud," and grammatical variations thereof, generally refers to a particulate bauxite reside formed as an industrial waste by-product of the Bayer process for production of aluminum. Red mud is an abundant material generally regarded as an environmental and health hazard requiring cleanup and disposal. Reuse of industrial by-products such as red mud is a promising way to attain green and sustained development.

Red mud of the present disclosure may have various chemical compositions. The elemental composition of red mud may be determined by elemental analysis techniques such as Wavelength Dispersive X-ray Fluorescence (WDXRF). The elemental composition of red mud may primarily include O, Na, Fe, Al, and Si, and lesser quantities of one or more of Ca, and Ti, based on the total elemental composition of red mud. The elemental composition of red mud may primarily include from about 20 wt % to about 40 wt %, including all wt % values and subsets therebetween, of each of O and Na, based on the total elemental weight of red mud (e.g., from about 20 wt % to about 35 wt %, from about 20 wt % to about 30 wt %, from about 20 wt % to about 25 wt %, from about 25 wt % to about 40 wt %, from about 25 wt % to about 30 wt %, from about 30 wt % to about 40 wt %, from about 30 wt % to about 35 wt %, from about 35 wt % to about 40 wt %). In an embodiment, red mud further includes Fe at from about 10 wt % to about 15 wt %, including all wt % values and subsets therebetween, based on the total elemental composition of red mud (e.g., from about 10 wt % to about 14 wt %, from about 10 wt % to about 13 wt %, from about 10 wt % to about 12 wt %, from about 10 wt % to about 11 wt %, from about 11 wt % to about 15 wt %, from about 11 wt % to about 14 wt %, from about 11 wt % to about 13 wt %, from about 11 wt % to about 12 wt %, from about 12 wt % to about 15 wt %, from about 12 wt % to about 14 wt %, from about 12 wt % to about 13 wt %, from about 13 wt % to about 15 wt %, from about 13 wt % toa bout 14 wt %, or from about 14 wt % to about 15 wt %). The elemental composition of red mud may further include the elements of Al, Si, Ca, and Ti, each present at from about 3 wt % to about 10 wt %, including all wt % values and subsets therebetween, based on the total elemental composition of red mud (e.g., about 10 wt %, about 9 wt %, about 8 wt %, about 7 wt %, about 6 wt %, about 5 wt %, about 4 wt %, or about 3 wt %, or from about 3 wt % to about 8 wt %). In an embodiment, red mud has the elemental composition as shown in Table 1.

Red mud may include untreated red mud. As used in the disclosure, the term "untreated" or "without treating" refers to not treated with alkali or acid, not bleached, not chemically altered, not oxidized, and without any extraction or reaction process other than possibly drying of water. The term "untreated" or "without treatments" does not encompass grinding or heating to remove moisture but does encompass chemical or other processes that may change the characteristics or properties of the red mud. In accordance with this definition, red mud that is treated may behave in a manner different than its original starting material. Red mud may undergo one or more treatment processes before, during or after washing, drying, crushing, grinding, or any other processing. Red mud may be treated to increase its absorbency and/or mechanical properties.

Red mud of the present disclosure may have various particle sizes and/or particle size distributions. Red mud may be further processed in order to achieve a desired particle size and/or particle size distribution. Red mud may be prepared by various pulverization methods. As used herein, the terms "pulverization," "pulverizing," and grammatical variations thereof, refer generally to reducing a material to very small particles. Suitable pulverizing methods may include, but are not limited to, crushing, pressing, grinding, sieving, the like, and any combination thereof. Red mud may be washed and/or dried (e.g., air dried, oven dried, or the like) prior to pulverization. Red mud may be pulverized by grinding in a suitable grinder, e.g., an industrial grinder. Red mud may be crushed to a first size before being ground to a smaller second size. Red mud may include, consist, or consist essentially of, crushed red mud, ground red mud, or any combination thereof.

Red mud may have various particle sizes, shapes, and/or distributions after pulverization. Red mud may include a mono-modal or multi-modal particle size (e.g., diameter) distribution. Pulverized red mud may be segregated to produce red mud having a specific size or size distribution. Red mud may be sifted using sieves having a sieve opening size that produces the desired particle size. Various volume-weighted particle size distributions may be reported, indicating the percent by volume of the particles which fall below a given particle size, in microns (μm), including D10 (i.e., 10% of particles fall below the indicated particle size), D50 (i.e., median size, 50% of particles fall below the indicated particle size), D80 (i.e., 80% of particles fall below the indicated particle size), D90 (i.e., 90% of particles fall below the indicated particle size), and D98 (i.e., 98% of particles fall below the indicated particle size).

Red mud may have a D50 particle size distribution value of about 500 micrometers (μm) or less, for example, as determined by sieve granulometry (e.g., about 450 μm or less, about 400 μm or less, about 350 μm or less, about 300 μm or less, about 250 μm or less, about 200 μm or less, about 150 μm or less, about 100 μm or less, or about 50 μm or less). Red mud may have a D80 particle size value of 50 μm, including all values and ranges therebetween (e.g., 45 μm, 40 μm, or 35 μm), as determined by sieve granulometry.

Depending on the size and/or size distribution, the red mud may seal gaps of various sizes when used to mitigate or prevent lost circulation in a well. Red mud may be generally granular shaped with various size ranges to enable the red mud to enter porous and permeable paths, cracks, and fractures in a formation causing mud losses in order to produce an effective seal, barrier, or other preventative to further mud losses.

Red mud of the present disclosure may be susceptible to various other curing or polymerization reactions, e.g., reactions of the red mud of the present disclosure with materials or compounds present in a subterranean formation into which the sealant compositions are introduced or as part of a subterranean operation fluid comprising the sealant compositions, such reactions including, but not limited to, pozzolanic reactions, geopolymerization reactions, the like, and any combination thereof. As used herein, the term "pozzolanic reaction," and grammatical variations thereof, refers to the polymerization reaction of finely ground siliceous and aluminous materials with calcium hydroxide in the presence of water at room temperatures or with heat to form calcium silicates hydrates (CSH) and calcium aluminates hydrates (CAH), to form cements. As used herein, the term "geopolymerization," and grammatical variants thereof, refers to the polymerization of an aluminosilicate material by an alkaline activator in the presence of heat, thus forming a geopolymer. As used herein, the term "geopolymer," and grammatical variants thereof, refers to a solid, three-dimensional tetrahedral silicon oxide network in which aluminum is substituted for silicon in at least a portion of the tetrahedral positions. Geopolymers may include linkages selected from: Si—S; Si—O; Al—O; Si—O—Si; Al—O—Al; Si—O—Al; Si—O—Al—O; Si—O—Al—O—Si—O; Si—O—Al—O—Si—O—Si—O; and any combination thereof.

Sealant compositions of the present disclosure may include various quantities of red mud. In an embodiment, sealant compositions include from about 0.1 wt % to about 50 wt % of red mud, including all wt % values and subsets therebetween, based on the total weight of the sealant composition (e.g., from about 0.1 wt % to about 40 wt %, from about 0.1 wt % to about 30 wt %, from about 0.1 wt % to about 20 wt %, from about 0.1 wt % to about 10 wt %, from about 0.1 to about 5 wt %, from about 0.1 wt % to about 1 wt %, from about 1 wt % to about 50 wt %, from about 1 wt % to about 40 wt %, from about 1 wt % to about 30 wt %, from about 1 wt % to about 20 wt %, from about 1 wt % to about 10 wt %, from about 1 to about 5 wt %, from about 5 wt % to about 50 wt %, from about 5 wt % to about 40 wt %, from about 5 wt % to about 30 wt %, from about 5 wt % to about 20 wt %, from about 5 wt % to about 10 wt %, from about 10 wt % to about 50 wt %, from about 10 wt % to about 40 wt %, from about 10 wt % to about 30 wt %, from about 10 wt % to about 20 wt %, from about 20 wt % to about 50 wt %, from about 20 wt % to about 40 wt %, from about 20 wt % to about 30 wt %, from about 30 wt % to about 50 wt %, from about 30 wt % to about 40 wt %, from about 40 wt % to about 50 wt %). In an embodiment, sealant compositions include from about 5 wt % to about 20 wt %.

Epoxy Resin System

Epoxy resin systems of the present disclosure may include at least two main components: an epoxy resin portion and a curing agent portion. Together, these components form a tough and dense composite upon setting for use in oil well sealing operations, such as cementing operations, lost circulation material (LCM) operations, the like, and any combination thereof.

Sealant compositions of the present disclosure may include various quantities of an epoxy resin system. Sealant compositions may include from about 50 weight percent (wt %) to about 99.9 wt % of an epoxy resin system, including all wt % values and subsets therebetween, based on the total weight of the sealant composition (e.g., from about 50 wt % to about 95 wt %, from about 50 wt % to about 90 wt %, from about 50 wt % to about 80 wt %, from about 50 wt % to about 70 wt %, from about 50 wt % to about 60 wt %, from about 60 wt % to about 99.9 wt %, from about 60 wt % to about 95 wt %, from about 60 wt % to about 90 wt %, from about 60 wt % to about 80 wt %, from about 60 wt % to about 70 wt %, from about 70 wt % to about 99.9 wt %, from about 70 wt % to about 95 wt %, from about 70 wt % to about 90 wt %, from about 70 wt % to about 80 wt %, from about 80 wt % to about 99.5 wt %, from about 80 wt % to about 95 wt %, from about 80 wt % to about 90 wt %, from about 90 wt % to about 99.9 wt %, from about 90 wt % to about 95 wt %, or from about 95 wt % to about 99.5 wt %).

Epoxy Resin Portion

As used in this disclosure, the term "epoxy resin portion" refers to the constituents of the epoxy resin system that include one or more epoxy resins and optionally one or more diluents, but exclude the curing agent or other curing additives, such as accelerators or retarders. Epoxy resin portions may include the one or more epoxy resins described herein and any added reactive diluent or non-reactive diluent described herein. Epoxy resin portions may comprise at least one epoxy resin, at least one diluent, or any combination thereof, as listed in Table 3.

Epoxy resin systems of the present disclosure may include various quantities of an epoxy resin portion. Epoxy resin systems may include from about 20 wt % to about 99 wt %, including all wt % values and subsets therebetween, of an epoxy resin portion, based on the total weight of the sealant composition (e.g., from about 20 wt % to about 97 wt %, from about 20 wt % to about 95 wt %, from about 20 wt % to about 90 wt %, from about 20 wt % to about 80 wt %, from about 20 wt % to about 70 wt %, from about 20 wt % to about 60 wt %, from about 20 wt % to about 50 wt %, from about 20 wt % to about 40 wt %, from about 20 wt % to about 30 wt %, from about 30 wt % to about 99 wt %, from about 30 wt % to about 97 wt %, from about 30 wt % to about 95 wt %, from about 30 wt % to about 90 wt %, from about 30 wt % to about 80 wt %, from about 30 wt % to about 70 wt %, from about 30 wt % to about 60 wt %, from about 30 wt % to about 50 wt %, from about 30 wt % to about 40 wt %, from about 40 wt % to about 99 wt %, from about 40 wt % to about 97 wt %, from about 40 wt % to about 95 wt %, from about 40 wt % to about 90 wt %, from about 40 wt % to about 80 wt %, from about 40 wt % to about 70 wt %, from about 40 wt % to about 60 wt %, from about 40 wt % to about 50 wt %, from about 50 wt % to about 99 wt %, from about 50 wt % to about 97 wt %, from about 50 wt % to about 95 wt %, from about 50 wt % to about 90 wt %, from about 50 wt % to about 80 wt %, from about 50 wt % to about 70 wt %, from about 50 wt % to about 60 wt %, from about 60 wt % to about 99 wt %, from about 60 wt % to about 97 wt %, from about 60 wt % to about 95 wt %, from about 60 wt % to about 90 wt %, from about 60 wt % to about 80 wt %, from about 60 wt % to about 70 wt %, from about 70 wt % to about 99 wt %, from about 70 wt % to about 97 wt %, from about 70 wt % to about 95 wt %, from about 70 wt % to about 90 wt %, from about 70 wt % to about 80 wt %, from about 80 wt % to about 99 wt %, from about 80 wt % to about 97 wt %, from about 80 wt % to about 95 wt %, from about 80 wt % to about 90 wt %, from about 90 wt % to about 99 wt %, from about 90 wt % to about 97 wt %, or from about 90 wt % to about 95 wt %). Epoxy resin systems may include from about 50 wt % to about 97 wt %, including all wt % values and subsets therebetween, of an epoxy resin portion, based on the total weight of the sealant composition.

Epoxy Resin

Epoxy resin portions of the present disclosure may include at least one epoxy resin. Epoxy resin portions may include various quantities of at least one epoxy resin. As used herein, the quantity of at least one epoxy resin in an epoxy resin system is the difference between the quantity of the epoxy resin portion, as disclosed herein, and the quantity of any diluents included therein, as disclosed herein. Epoxy resin portions may include from about 70 wt % to about 100 wt %, including all wt % values and subsets therebetween, of at least one epoxy resin, based on the total weight of the epoxy resin portion (e.g., from about 70 wt % to about 99 wt %, from about 70 wt % to about 97 wt %, from about 70 wt % to about 95 wt %, from about 70 wt % to about 90 wt %, from about 70 wt % to about 85 wt %, from about 70 wt % to about 80 wt %, from about 70 wt % to about 75 wt %, from about 75 wt % to about 100 wt %, from about 75 wt % to about 99 wt %, from about 75 wt % to about 97 wt %, from about 75 wt % to about 95 wt %, from about 75 wt % to about 90 wt %, from about 75 wt % to about 85 wt %, from about 75 wt % to about 80 wt %, from about 80 wt % to about 100 wt %, from about 80 wt % to about 99 wt %, from about 80 wt % to about 97 wt %, from about 80 wt % to about 95 wt %, from about 80 wt % to about 90 wt %, from about 80 wt % to about 85 wt %, from about 85 wt % to about 100 wt %, from about 85 wt % to about 99 wt %, from about 85 wt % to about 97 wt %, from about 85 wt % to about 95 wt %, from about 85 wt % to about 90 wt %, from about 90 wt % to about 100 wt %, from about 90 wt % to about 99 wt %, from about 90 wt % to about 97 wt %, from about 90 wt % to about 95 wt %, from about 95 wt % to about 100 wt %, from about 95 wt % to about 99 wt %, from about 95 wt % to about 97 wt %, from about 97 wt % to about 100 wt %, from about 97 wt % to about 99 wt %, or from about 99 wt % to about 100 wt %) (i.e., from about 14 wt % to about 99 wt %, including all wt % values and subsets therebetween, of at least one epoxy resin, based on the total weight of the sealant composition). Epoxy resin portions include from about 50 wt % to about 97 wt %, including all wt % values and subsets therebetween, of one or more epoxy resins, based on the total weight of the epoxy resin portion Epoxy resin portions of the present disclosure may include various types of epoxy resins. Epoxy resin portions may include a single epoxy resin or a combination of two or more different epoxy resins. Suitable examples of epoxy resins include, but are not limited to, bisphenol-epichlorohydrin epoxy resins, novolak epoxy resins, and compounds of formula (I):

$$[(OC_2H_3)—CH_2—O]_x—R^1 \quad (I),$$

wherein $R^1$ is a hydrocarbyl group (e.g., linear, branched, cyclic, aromatic, or any combination thereof) having a carbon atom number of from about 6 (C6) to about 24 (C24) carbon atoms, including all carbon atom numbers and subsets therebetween (e.g., from about C6 to about C20, from about C6 to about C16, from about C6 to about C12, from about C6 to about C8, from about C8 to about C24, from about C8 to about C20, from about C8 to about C16, from about C8 to about C12, from about C12 to about C24, from about C12 to about C20, from about C12 to about C16, from about C16 to about C24, from about C16 to about C20, from about C20 to about C24); where x is ≥2; derivatives thereof, and any combination thereof.

Epoxy resins may be selected from the group consisting of 1,6-hexanediol diglycidyl ether, 1,4-cyclohexanedimethanol diglycidyl ether, bisphenol-epichlorohydrin epoxy resins, novolak epoxy resins, the like, and any combination thereof. Bisphenol diglycidyl ethers can be prepared by reacting bisphenol (e.g., bisphenol-A, bisphenol-F, or the like) with epichlorohydrin, generally with sodium hydroxide as catalyst. Bisphenol diglycidyl ethers are small molecules with epoxy groups at both ends of the molecule which can undergo reactions of ring opening, crosslinking, and solidification in the presence of curing agents (e.g., amines, anhydrides). When there is sufficient epichlorohydrin and sodium hydroxide catalyst, the product of the reaction is bisphenol diglycidyl ether. However, excessive bisphenol generates linear high molecular weight compounds with hydroxy groups, ether groups, and/or terminal epoxy groups, where ether bonds increase flexibility of the molecule, hydroxy groups enhance chemical reactivity and bonding ability of the molecule, and epoxy groups allow crosslinking of the molecule into a three-dimensional network by reacting with curing agents.

Bisphenol-epichlorohydrin epoxy resins may comprise at least one component selected from the group consisting of bisphenol diglycidyl ethers, epoxy-functional oligomers thereof, epoxy-functional polymers thereof, the like, and any combination thereof. Bisphenol-epichlorohydrin epoxy resins may comprise at least one component selected from the group consisting of bisphenol-A-diglycidyl ethers, bisphenol-F-diglycidyl ethers, epoxy-functional oligomers thereof, epoxy-functional polymers thereof, the like, and any combination thereof.

Novolaks may be prepared from the acid catalyzed reaction of phenols, o-cresol, p-cresol, m-cresol, or bisphenol with formaldehyde. Novolak epoxy resins may be prepared from the subsequent reaction of novolaks with epichlorohydrin. Novolak epoxy resins may be selected from the group consisting of phenol novolak epoxy resins, o-cresol novolak epoxy resins, bisphenol novolak epoxy resins, the like, and any combination thereof. Bisphenol novolak epoxy resins may be selected from the group consisting of bisphenol-A novolak epoxy resins, bisphenol-F novolak epoxy resins, the like, and any combination thereof.

Suitable commercial examples of Bisphenol-A-epichlorohydrin epoxy resins include, but are not limited to, RAZEEN® series epoxy resins (e.g., RAZEEN® LR 2254), and WellLock® series epoxy resins (e.g., WellLock® R1). Suitable commercial examples of cyclohexanedimethanol diglycidyl ether epoxy resins include, but are not limited to, RAZEEN® series epoxy resins (e.g., RAZEEN® LR 2254), and WellLock® series epoxy resins (e.g., WellLock® R2).

Epoxy resins of the present disclosure may have various epoxy equivalent weight values selected to enable curing of sealant compositions of the present disclosure into a solidified, rigid cement. As used herein, the term "epoxy equivalent weight," and grammatical variations thereof, refers to the weight in grams of an epoxy-functional compound (e.g., epoxy resins) that contains one equivalent of an epoxy group.

The epoxy equivalent weight of the epoxy resin is equal to the molecular weight of the epoxy resin divided by the average number of epoxy groups in the epoxy resin. Epoxy resins may have an epoxy equivalent weight of from about 170 grams of epoxy resin per epoxy group equivalent weight (g/eq) to about 350 g/eq, including all g/eq values and subsets therebetween (e.g., from about 180 g/eq to about 300 g/eq, from about 180 g/eq to about 250 g/eq, from about 180 g/eq to about 225 g/eq, from about 180 g/eq to about 200 g/eq, from about 180 g/eq to about 190 g/eq, from about 190 g/eq to about 350 g/eq, from about 190 g/eq to about 300 g/eq, from about 190 g/eq to about 250 g/eq, from about 190 g/eq to about 225 g/eq, from about 190 g/eq to about 200 g/eq, from about 200 g/eq to about 350 g/eq, from about 200 g/eq to about 300 g/eq, from about 200 g/eq to about 250 g/eq, from about 200 g/eq to about 225 g/eq, from about 225 g/eq to about 350 g/eq, from about 225 g/eq to about 300 g/eq, from about 225 g/eq to about 250 g/eq, from about 250 g/eq to about 350 g/eq, or from about 250 g/eq to about 300 g/eq). Epoxy resins of the present disclosure may have an epoxy equivalent weight value of from about 180 g/eq to about 225 g/eq. Epoxy resins may include 1,6-hexanediol diglycidyl ether, which has an epoxy equivalent weight of from 150 g/eq to 170 g/eq and may exhibit a dynamic viscosity of from 20 mPa·s to 30 mPa·s.

Alternately, epoxy equivalent weight may be described as an epoxy value. As used herein, the term "epoxy value," and grammatical variations thereof, generally refers to the number of epoxy equivalents per kilogram (eq/kg) of an epoxy-functional compound (e.g., epoxy resins). Epoxy resins may have an epoxy value of from about 2.86 eq/kg to about 5.88 eq/kg, including all epoxy value and subsets therebetween (e.g., from about 4.5 eq/kg to about 5.5 eq/kg). The epoxy equivalent weight and the epoxy value of an epoxy-functional compound may be determined according to ASTM-D1652. Other methods of determining the epoxy value and epoxy equivalent weight of an epoxy-functional compound may also be used to determine the epoxy value or epoxy equivalent weight of epoxy resins.

Epoxy resins may have a viscosity that enables introduction of sealant compositions having the epoxy resin into a wellbore. When the epoxy resin system is included in a cement-like slurry composition, epoxy resins may have a high viscosity that enables injection of the resin system slurry into a subterranean formation, such as a high-injectivity zone. Epoxy resins may have a viscosity that enables sealant compositions to be transferred into the annulus between the exterior surface of the casing and the formation face of the wellbore, or the annulus between the interior surface of an outer casing and the exterior surface of an inner casing surrounded by the outer casing.

Epoxy resins of the present disclosure may have an epoxy value of from about 4.76 eq/kg to about 5.26 eq/kg (i.e., an epoxy equivalent weight of from about 190 g/eq to about 210 g/eq) and exhibit a dynamic viscosity of from 600 millipascal seconds (mPa·s) to 1200 mPa·s, or 600 mPa·s to 900 mPa·s. Epoxy resins may have an epoxy equivalent weight of from 270 g/eq to 305 g/eq and may exhibit a dynamic viscosity of from 5 mPa·s to 12 mPa·s. Epoxy resins may have an epoxy equivalent weight of from 170 g/eq to 190 g/eq and exhibit a dynamic viscosity of from 7 mPa·s to 10 mPa·s.

Diluents

Epoxy resin portions may further include a reactive diluent, a non-reactive diluent, or any combination thereof. As used herein, the term "reactive diluent" refers to a diluent that participated in a chemical reaction during reaction of the epoxy resin, as compared to a "non-reactive diluent," which refers to a diluent that does not participate in a chemical reaction during reaction of the epoxy resin. The type and amount of reactive and/or non-reactive diluent may influence the viscosity, flexibility, hardness, chemical resistance, mechanical properties, plasticizing effect, reactivity, crosslinking density, or other properties of the epoxy resin. Reactive diluents and/or non-reactive diluents may be added to the epoxy resin portion to change the viscosity of the epoxy resin, such as to reduce the viscosity of the epoxy resin. Reactive diluents and/or non-reactive diluents may be added to epoxy resin portions to improve at least one of the adhesion, the flexibility, and the solvent resistance of the epoxy resin.

Reactive diluents can be functional reactive diluents or non-functional reactive diluents. As used in relation to reactive diluents, the term "functional" refers to the number of epoxide functional groups present in a reactive diluent molecule (e.g., a reactive diluent may be mono-functional, di-functional, or multi-functional). Thus, a reactive diluent may have one, two, three, or more than three epoxide functional groups. The term "non-functional," as used in relation to a reactive diluent, refers to a reactive diluent that does not have at least one epoxide functional group. Thus, a non-functional reactive diluent does not have at least one epoxide functional group, but still participates in at least one chemical reaction during reaction of the epoxide resin with the curing agent. Epoxy resin portions may include a functional reactive diluent, a non-functional reactive diluent, a non-functional diluent, or any combination thereof.

Epoxy resin systems may comprise various types of reactive diluents. Suitable examples of reactive diluents include, but are not limited to: a compound of formula (I), wherein $R^1$ is a hydrocarbyl group having a carbon atom number of from about 2 (C2) to about 5 (C5), including all carbon atom values and subsets therebetween (e.g., from about C2 to about C4, from about C2 to about C3, from about C3 to about C5, from about C3 to about C4, or from about C4 to about C5); a compound of formula (II):

$$(OC_2H_3)—CH_2—R^2 \quad \text{(II)},$$

where $R^2$ is a hydrocarbyl group (e.g., linear, branched, cyclic, aromatic, or any combination thereof) having a carbon atom number of from about 4 (C4) to about 24 (C24) carbon atoms, including all carbon atom numbers and subsets therebetween (e.g., from about C4 to about C20, from about C4 to about C16, from about C4 to about C12, from about C4 to about C8, from about C4 to about C6, from about C6 to about C24, from about C6 to about C20, from about C6 to about C16, from about C6 to about C12, from about C6 to about C8, from about C8 to about C24, from about C8 to about C20, from about C8 to about C16, from about C8 to about C12, from about C12 to about C24, from about C12 to about C20, from about C12 to about C16, from about C16 to about C24, from about C16 to about C20, from about C20 to about C24); derivatives thereof; and any combination thereof.

$R^2$ may be selected from the group consisting of a tolyl group, an alkyl group, a cardanol group, derivatives thereof, and any combinations thereof. Examples of functional reactive diluents may include, but are not limited to, propylene glycol diglycidyl ether, butanediol diglycidyl ether, cardanol glycidyl ether derivatives, propanetriol triglycidyl ether, alkyl glycidyl ethers (e.g., C12-14 alkyl glycidyl ethers, C13-C15 alkyl glycidyl ethers, or the like), 2,3-epoxypropyl o-tolyl ether, and any combinations thereof. The compound of formula (II) may be a C12-C14 alkyl glycidyl ether, also referred to herein as "oxirane mono [(C12-C14)-alkyloxy) methyl]derivatives". Suitable commercial examples of C 12-C14 alkyl glycidyl ether reactive diluent include, but are not limited to, RAZEEN® series reactive diluents (e.g., RAZEEN® 7106).

Epoxy resin portions may include an amount of reactive diluent that reduces the viscosity of the epoxy resin. Epoxy resin portions may include an amount of reactive diluent that modifies one or more of the adhesion, the flexibility, or the solvent resistance of the epoxy resin. Epoxy resin portions may include from 1 wt % to 30 wt % reactive diluent, including all wt % values and subsets therebetween, based on the total weight of the epoxy resin portion (e.g., from about 1 wt % to about 20 wt %, from about 1 wt % to about 15 wt %, from about 1 wt % to about 10 wt %, from about 1 wt % to about 5 wt %, from about 5 wt % to about 30 wt %, from about 5 wt % to about 20 wt %, from about 5 wt % to about 15 wt %, from about 5 wt % to about 10 wt %, from about 10 wt % to about 30 wt %, from about 10 wt % to about 20 wt %, from about 10 wt % to about 15 wt %, from about 15 wt % to about 30 wt %, from about 15 wt % to about 20 wt %, from about 20 wt % to about 30 wt %) (i.e., from about 0.2 wt % to about 30 wt %, including all wt % values and subsets therebetween, of reactive diluent, based on the total weight of the sealant composition).

Functional reactive diluents may have epoxide equivalent weight (EWW) values or epoxide values determined according to the same methods as for epoxy resins. Addition of functional reactive diluents may increase the epoxy equivalent weight of an epoxy resin portion to a value sufficient to enable curing of sealant compositions of the present disclosure into a solidified, rigid cement. Epoxy resin portions including epoxy resins and functional reactive diluents may have an average epoxy equivalent weight of from about 170 grams of epoxy resin per equivalent weight of an epoxy group (g/eq) to about 350 g/eq, including all g/eq values and subsets therebetween (e.g., from about 180 g/eq to about 300 g/eq, from about 180 g/eq to about 250 g/eq, from about 180 g/eq to about 225 g/eq, from about 180 g/eq to about 200 g/eq, from about 180 g/eq to about 190 g/eq, from about 190 g/eq to about 350 g/eq, from about 190 g/eq to about 300 g/eq, from about 190 g/eq to about 250 g/eq, from about 190 g/eq to about 225 g/eq, from about 190 g/eq to about 200 g/eq, from about 200 g/eq to about 350 g/eq, from about 200 g/eq to about 300 g/eq, from about 200 g/eq to about 250 g/eq, from about 200 g/eq to about 225 g/eq, from about 225 g/eq to about 350 g/eq, from about 225 g/eq to about 300 g/eq, from about 225 g/eq to about 250 g/eq, from about 250 g/eq to about 350 g/eq, or from about 250 g/eq to about 300 g/eq).

Diluents may further include one or more viscosity modifiers, such as cardanol liquid, polyacrylate flow agents, or combinations of these, to decrease the viscosity of the epoxy resin. Such viscosity modifiers may be reactive, non-reactive, functional, and/non-functional diluents.

Curing Agent Portion

As used in this disclosure, the term "curing agent portion" refers to the constituents of the epoxy resin system that do not include one or more epoxy resins, or optionally one or more diluents, but include the curing agent and optionally curing additives, such as accelerators or retarders. In an embodiment, the curing agent portion comprises one or more curing agents of the present disclosure and optionally one or more curing additives of the present disclosure.

Epoxy resin systems of the present disclosure include a curing agent to transform the epoxy resin into a semi-solid (i.e., elastic) or solid (i.e., rigid) material. Curing agents may include a single type of curing agent or two or more different types of curing agents. In general, setting time can be controlled by varying either the type of curing agents and/or epoxy resins as well as by varying the concentrations of the curing agents and/or the epoxy resins. Curing agents may include any curing agent of the present disclosure. Curing agents comprise at least one curing agent listed in Table 3.

Curing agents of the present disclosure may comprise or consist of or consist essentially of nitrogenous curing agents. Nitrogenous curing agents may comprise at least one agent selected from the group consisting of amines, polyamines, amine adducts, polyamine adducts, alkanolamines, polyetheramines, amides, polyamides, polyamide adducts, amidoamines, polyamidoamines, phenalkamines, imidazoles, and combinations of these. Nitrogenous curing agents may comprise at least one agent selected from the group consisting of amine curing agents, polyamine curing agents, amine adduct curing agents, and polyamine adduct curing agents. Amine curing agents may include, but are not limited to, aliphatic amines, aromatic amines, heterocyclic amines, cycloaliphatic amines, and modified cycloaliphatic amines such as cycloaliphatic amines modified by polyacrylic acid. Polyamine curing agents may include, but are not limited to, aliphatic polyamines, cycloaliphatic polyamines, and modified polyamines such as polyamines modified by polyacrylic acid. Amine adduct curing agents may include, but are not limited to, cycloaliphatic amine adducts.

Curing agents may include an amine type curing agent, which helps in building the viscosity and control setting time. Curing agents may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), diethyl toluene diamine (DETDA), polyoxypropylene diamine, or combinations of these. Curing agents may include at least one of DETA, TETA, TEPA, IPDA, DEDTA, or combinations of these. Curing agents may include tetraethylenepentamine (TEPA). Suitable commercially available curing agents include, but are not limited to, RAZEEN® CURE series curing agents (e.g., RAZEEN® CURE 931), and WellLock series curing agents (e.g., WellLock H1).

Curing agents may have an amine value that enables the curing agent to fully cure the epoxy resin system. Amine values of curing agents may indicate an active hydrogen (NH) content of a curing agent. As used herein, the term "amine value" generally refers to the weight in milligrams of potassium hydroxide (KOH) needed to neutralize the NH in 1 gram of the amine curing agent. Curing agents may have an amine value of from about 250 milligrams of KOH per gram (mg KOH/g) to about 1700 mg KOH/g, including all mg KOH/g values and subsets therebetween (e.g., from about 250 mg KOH/g to about 1650 mg KOH/g, from about 250 mg KOH/g to about 1600 mg KOH/g, from about 450 mg KOH/g to about 1700 mg KOH/g, from about 450 mg KOH/g to about 1650 mg KOH/g, from about 450 mg KOH/g to about 1600 mg KOH/g, from about 650 mg KOH/g to about 1700 mg KOH/g, from about 650 mg KOH/g to about 1650 mg KOH/g, or from about 650 mg KOH/g to about 1600 mg KOH/g). The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1:

$$\frac{V_{HCl} * N_{HCl} * MW_{KOH}}{W}, \qquad (1)$$

where $V_{HCl}$ is the volume in milliliters of HCl needed to neutralize the NH, $N_{HCl}$ is the normality of HCl used to titrate the amine, $MW_{KOH}$ is the molecular weight of KOH in grams per mole, and W is the weight in grams of the curing agent sample titrated. The amine number of the known pure curing agent may be calculated from Equation 2:

$$\frac{1000 * MW_{KOH}}{MW_{curing\ agent}}, \qquad (2)$$

where $MW_{KOH}$ is the molecular weight of KOH in grams per mole, and $MW_{curing\ agent}$ is the molecular weight of the curing agent in grams per mole.

The curing agent may have an amine hydrogen equivalent weight (AHEW) that enables the curing agent to fully cure the epoxy resin system. The AHEW of a curing agent refers to the grams of the curing agent containing 1 equivalent of amine. The AHEW of a curing agent may be calculated by dividing the molecular weight of the curing agent in grams per mole by the number of active hydrogens per molecule. In an embodiment, the curing agent has an AHEW of from about 20 grams (g) to about 120 g, including all gram values and subsets therebetween, as determined according to the methods previously described in this disclosure (e.g., from about 20 g to about 115 g, from about 20 g to about 110 g, from about 20 g to about 100 g, from about 40 g to about 120 g, from about 40 g to about 115 g, from about 40 g to about 110 g, from about 40 g to about 110 g, from about 60 g to about 120 g, from about 60 g to about 115 g, or from about 60 g to about 110 g).

Epoxy resin systems of the present disclosure may include various quantities of a curing agent. Epoxy resin systems may include from about 0.1 wt % to about 30 wt %, including all wt % values and subsets therebetween, of a curing agent, based on the total weight of the sealant composition (e.g., from about 0.1 wt % to about 20 wt %, from about 0.1 wt % to about 10 wt %, from about 0.1 wt % to about 2 wt %, from about 0.1 wt % to about 1 wt %, from about 1 wt % to about 30 wt %, from about 1 wt % to about 20 wt %, from about 1 wt % to about 10 wt %, from about 1 wt % to about 5 wt %, from about 1 wt % to about 2 wt %, from about 2 wt % to about 30 wt %, from about 2 wt % to about 20 wt %, from about 2 wt % to about 10 wt %, from about 2 wt % to about 5 wt %, from about 5 wt % to about 30 wt %, from about 5 wt % to about 20 wt %, from about 5 wt % to about 10 wt %, from about 10 wt % to about 30 wt %, from about 10 wt % to about 20 wt %, from about 20 wt % to about 30 wt %).

Sealant composition of the present disclosure may include an amount of a curing agent capable of curing the sealant compositions to a semi-solid state. Sealant compositions may transition from a liquid state to a semi-solid state at room temperature (e.g., about 25° C.). Sealant compositions may include an amount of a curing agent capable of curing the sealant compositions to a semi-solid state in a curing time of from about 4 hours to more than about 9 hours, including all hour values and subsets therebetween (e.g., from about 4 hours to about 9 hours, from about 4 hours to about 8 hours, from about 4 hours to about 7 hours, from about 4 hours to about 6 hours, or 4 hours, 5 hours, 6 hours, 7 hours, 8 hours, or 9 hours).

Sealant compositions may include an amount of a curing agent capable of further curing the sealant composition to a solid state (e.g., a rigid state). Sealant compositions may transition from a liquid state to a semi-solid state to a solid state at subterranean formation temperatures. Sealant compositions may include an amount of a curing agent capable of curing the sealant compositions to a solid state in a curing time of from about 6 hours to more than about 36 hours, including all hour values and subsets therebetween (e.g., from about 3 hours to about 30 hours, from about 6 hours to about 20 hours, from about 6 hours to about 10 hours, from about 6 hours to about 7 hours, from about 7 hours to about 36 hours, from about 7 hours to about 30 hours, from about 7 hours to about 20 hours, from about 7 hours to about 10 hours, from about 10 hours to about 36 hours, from about 10 hours to about 30 hours, from about 10 hours to about 20 hours, from about 20 hours to about 36 hours, from about 20 hours to about 30 hours, or from about 30 hours to about 36 hours).

Sealant compositions may be capable of curing to a semi-solid state at from about 4 hours to about 6 hours and/or to a solid state in from about 7 hours to about 30 hours and includes from about 0.1 wt. % to about 20 wt %, including all wt % values and subsets therebetween, of a curing agent, based on the total weight of the sealant composition.

Curing Additives

While the thickening and setting times of sealant compositions of the present disclosure may be influenced or otherwise accelerated or delayed by adjusting the concentration of the components of the sealant compositions, epoxy resin systems of the present disclosure may also include one or more additives to modify the speed of the reaction between the epoxy resin and the nitrogenous curing agent or to modify other properties of the resin system, such as viscosity, yield point (YP), or other rheological properties. Epoxy resin systems may further include a cure retarding agent to slow down the reaction between the epoxy resin and the curing agent or an accelerator to speed up said reaction. The thickening and setting time of the sealant compositions of the present disclosure must be designed to be sufficiently long to enable performance of drilling operations, cementing operations, fluid loss control operations, enhanced recovery operations, the like, and any combination thereof, e.g., where the sealant compositions remain in a flowable state until the operation is complete. Suitable cure retarding agents may include, but are not limited to lignin, gums, starches, lignosulphonate derivatives, or combinations of these. Suitable accelerators may include, but are not limited to, alcohols, phenols, aminoalcohols, amines, or combinations of these.

Sealant compositions may include a type and/or an amount of an accelerator capable of initiating and/or speeding up curing reactions of sealant compositions of the present disclosure. Sealant compositions may include a type and/or an amount of an accelerator which decreases the setting time of the sealant composition from greater than about 12 hours to a cure time in a range of from about 1 hour to about 12 hours. Sealant compositions may include from about 0.01 wt % to about 10 wt %, including all wt % values and subsets therebetween, of an accelerator, based on the total weight of the sealant composition (e.g., from about 0.01 wt % to about 5 wt %, from about 0.01 wt % to about 3 wt %, from about 0.01 wt % to about 1 wt %, from about 0.1 wt % to about 10 wt %, from about 0.1 wt % to about 5 wt %, from about 0.1 wt % to about 3 wt %, from about 0.1 wt % to about 1 wt %, from about 1 wt % to about 10 wt %, from about 1 wt % to about 5 wt %, or from about 1 wt % to about 3 wt %).

Cure retarding agents of the present disclosure may further prevent, delay, and/or slow various other polymerizations reactions, e.g., pozzolanic reactions, geopolymerization reactions, the like, or any combination thereof. Accelerators of the present disclosure may further initiate and/or speed up said other polymerization reactions, thus allowing further control of formation of the solidified sealant compositions described herein.

Emulsifiers

Sealant compositions may include various types of emulsifiers. As used herein, the term "emulsifier," and grammatical variations thereof, generally refer to surfactants capable of stabilizing emulsions. Emulsifiers may be used to stabilize oil-in-water emulsions or invert emulsions (i.e., water-in-oil emulsifiers). Emulsifiers may also be used in all-water fluids or all-oil fluids. Emulsifiers may be nonionic emulsifiers, anionic emulsifiers, cationic emulsifiers, or any combination thereof.

Suitable types of emulsifiers may include alkoxylated alkyl phenols (e.g., ethoxylated alkyl phenols), alkoxylated phenols (e.g., ethoxylated phenols), alkyl phenols (e.g., nonyl phenols), fatty acids (e.g., refined tall oil fatty acids), fatty acid salts (e.g., calcium oleate), fatty acid derivatives (e.g., oxidized fatty acids, fatty acid polyamides, and any combination thereof), lecithins (e.g., soya lecithins), glycol ethers (e.g., ethylene glycol monobutyl ether, diethylene glycol monobutyl ether, the like, and any combination thereof), unsaturated fatty alkyl ethoxylate carboxylic acids (e.g., glycolic acid ethoxylate oleyl ether), modified amidoamines, polyolefin amide alkeneamine, the like, or any combination thereof. Fatty acid polyamides may be selected from the group consisting of carboxylic acid terminated polyamides, reaction products of fatty acid (e.g., tall oil fatty acid) and polyamines (e.g., diethylene triamine, tetraethylenepentamine, and/or triethylenetetramine) and optionally anhydrides (e.g., maleic anhydride), and any combination thereof. Polyamides may be full polyamides or partial amides (e.g., ⅔ amides). Emulsifiers of the present disclosure may comprise at least one emulsifier selected from at least one genus and/or species of chemical compounds selected from Table 5.

Suitable emulsifiers may further be dissolved or dispersed in a solvent. Suitable solvents for emulsifiers may include, but are not limited to, water, alcohol (e.g., isopropanol), petroleum oil (e.g., mineral oil, paraffin oil, diesel oil), vegetable oil (e.g., soybean oil), synthetic hydrocarbons (e.g., paraffins, linear α-olefins, poly((α-olefins), internal olefins (e.g., isomerized α-olefins)), glycol ethers (e.g., ethylene glycol monobutyl ether, diethylene glycol monobutyl ether, the like, and any combination thereof), or the like, or any combination thereof.

Sealant compositions may include various amounts of an emulsifier. Sealant compositions may include from about 0.1 wt % to about 30 wt %, including all wt % values and subsets therebetween, of emulsifier, based on the total weight of the sealant composition (e.g., from about 0.1 wt % to about 20 wt %, from about 0.1 wt % to about 10 wt %, from about 1 wt % to about 30 wt %, from about 1 wt % to about 20 wt %, from about 1 wt % to about 10 wt %, from about 5 wt % to about 30 wt %, from about 5 wt % to about 20 wt %, from about 5 wt % to about 10 wt %, from about 10 wt % to about 30 wt %, from about 10 wt % to about 20 wt %, from about 20 wt % to about 30 wt %).

Weighting Materials

Sealant compositions may include one or more weighting materials. Weighting materials may be added to sealant compositions of the present disclosure to add density to the sealant compositions, which in turn may assist the placement of said sealant compositions within deep wells and may provide resistance to severe external loads imposed on casings and cements. Weighting materials may be particulate solids having a specific gravity (SG) that increases the density of the sealant composition. Weighting materials may be added to the sealant composition to increase the density of the final cured resin to increase the hydrostatic pressure exerted by the sealant composition on a formation face of the wellbore or an interior surface of an outer casing surrounding an inner casing. The final density of the cured resin may depend on the geology of the subterranean formation in the zone being sealed. For example, a subterranean formation may require sealant compositions having a greater density to support the wellbore and prevent flow of fluids from the subterranean formation into the wellbore during curing of the sealant composition.

Weighting materials may have a specific gravity (SG) of from 2 to 6. Suitable examples of weighting materials may include, but are not limited to, sand, barite (barium sulfate), hematite, calcium carbonate, siderite, ilmenite, silica sand, manganese oxide (MnO), hausmannite (manganese tetraoxide ($Mn_3O_4$)), zinc oxide, zirconium oxide, iron oxide, fly ash, or any combination of these weighting materials. Sealant compositions may include $Mn_3O_4$ weighting materials.

Sealant compositions may include an amount of weighting materials that increases the density of the sealant composition. Sealant compositions may include from about 0.1 wt % to about 40 wt %, including all wt % values and subsets therebetween, of weighting material, based on the total weight of the sealant composition (e.g., from about 0.1 wt % to about 30 wt %, from about 0.1 wt % to about 20 wt %, from about 0.1 wt % to about 10 wt %, from about 1 wt % to about 40 wt %, from about 1 wt % to about 30 wt %, from about 1 wt % to about 20 wt %, from about 1 wt % to about 10 wt %, from about 5 wt % to about 40 wt %, from about 5 wt % to about 30 wt %, from about 5 wt % to about 20 wt %, from about 5 wt % to about 10 wt %, from about 10 wt % to about 40 wt %, from about 10 wt % to about 30 wt %, from about 10 wt % to about 20 wt %, from about 20 wt % to about 40 wt %, from about 20 wt % to about 30 wt %, or from about 30 wt % to about 40 wt %). Sealant compositions may include from about 1 wt % to about 40 wt % barite, calcium carbonate, and/or hausmannite ($Mn_3O_4$) weighting materials.

Sealant Compositions

Flowable sealant compositions of the present disclosure are required to be pumpable and suitable for use as a subterranean formation operation fluid, e.g., a drilling fluid, a cementing slurry, the like, or any combination thereof. For example, sealant compositions may be adapted to different downhole conditions by changing the concentrations of the epoxy resin, curing agents, accelerators, cure retarding agents, emulsifiers, or weighting materials in the sealant composition to modify the specific gravity, rheology, fluid loss, mechanical properties, thickening and/or curing time, gas and fluid migration, or other properties of the sealant compositions.

The rheology and density of flowable sealant compositions may be adjusted over a wide range of values depending on the requirement for the well and the downhole conditions of the well. Sealant compositions may have a density that enables the sealant composition to exert hydrostatic pressure on the wellbore wall or interior surface of an outer casing to support the wellbore, prevent fluids from flowing from the subterranean formation into the wellbore, or both. Sealant compositions may have a density of from about 55 pounds per cubic foot ($lbm/ft^3$) to about 170 $lbm/ft^3$, including all $lbm/ft^3$ values and subsets therebetween (e.g., from 55 $lbm/ft^3$ to 150 $lbm/ft^3$, from 55 $lbm/ft^3$ to 130 $lbm/ft^3$, from 55 $lbm/ft^3$ to 110 $lbm/ft^3$, from 55 $lbm/ft^3$ to 90 $lbm/ft^3$, from 60 $lbm/ft^3$ to 170 $lbm/ft^3$, from 60 $lbm/ft^3$ to 150 $lbm/ft^3$, from 60 $lbm/ft^3$ to 130 $lbm/ft^3$, from 60 $lbm/ft^3$ to 110 $lbm/ft^3$, from 60 $lbm/ft^3$ to 90 $lbm/ft^3$, from 80 $lbm/ft^3$ to 170 $lbm/ft^3$, from 80 $lbm/ft^3$ to 130 $lbm/ft^3$, from 80 $lbm/ft^3$ to 110 $lbm/ft^3$, from 90 $lbm/ft^3$ to 150 $lbm/ft^3$, or from 90 $lbm/ft^3$ to 130 $lbm/ft^3$).

Mixing may be done in the lab using a standard API blender for 15 seconds at 4,000 revolutions per minute (rpm) and 35 seconds at 12,000 rpm. The equation of mixing energy for the sealant composition (slurry) is shown in Equation 3:

$$\frac{E}{M} = \frac{k\omega^2 t}{V}, \tag{3}$$

where:

E=Mixing energy (kiloJoules (kJ)),

M=Mass of slurry (kilograms (kg)), k=$6.1\times10^{-8}$ $m^5/s$ (constant found experimentally), ω=Rotational speed (radians/second ($s^{-1}$)), t=Mixing time (s), and V=Slurry volume ($m^3$).

The viscosity of sealant compositions may be measured using a standard oilfield viscometer, such as a FANN® Model 35 viscometer manufactured by Fann Instrument Company for example, according to test methods provided in the *API Recommended Practice For Field Testing Water-Based Cement Slurries* (RP 13B-1/ISO 10414-1:2002). The viscometer may report shear stress readings at various shear rates. The shear stress readings may be reported in units of pounds of force per 100 square feet (lbf/100 $ft^2$). The shear rate is measured in rpm. The viscometer may report shear stress readings at shear rates of at least one of 600 rpm, 300 rpm, 200 rpm, 100 rpm, 6 rpm, or 3 rpm. These shear stress readings may be used to determine the viscosity of sealant compositions at any of the shear rates, using Equation 4, assuming a viscometer with an R1 rotor sleeve, B1 bob, and F1 torsion spring:

$$\mu = \frac{300}{N}\theta_N, \tag{4}$$

where:

μ=viscosity (cP),

N=viscometer speed, shear rate (rpm), $\theta_N$=viscometer reading, shear stress (lbf/100 $ft^2$).

The rheology of sealant compositions may be modeled based on Bingham plastic flow behavior. In particular, sealant compositions having a red mud behaves as a rigid body at lesser shear stress but flows as a viscous fluid at greater shear stress. The rheological behavior of the resin system may be determined by measuring the shear stress on the resin system at different shear rates, which may be accomplished by measuring the shear stress and/or shear rate on the resin system using a FANN® Model 35 viscometer operated at 3 rpm, 6 rpm, 100 rpm, 200 rpm, 300 rpm, or 600 rpm, for example. A Bingham plastic fluid may be modeled by Equation 5.

$$\tau = (PV)\dot{\gamma} + 4.79YP, \tag{5}$$

where:

τ=shear stress (dynes per square centimeter ($dyne/cm^2$)),

PV=plastic viscosity (cP), $\dot{\gamma}$=shear rate ($s^{-1}$),

YP=yield point (lbf/100 $ft^2$).

The rheology of sealant compositions may be evaluated from the plastic viscosity (PV) and the yield point (YP), which are parameters from the Bingham plastic rheology model. The PV is related to the resistance of the sealant composition to flow due to mechanical interaction between the solids of the mixture and represents the viscosity of the sealant composition extrapolated to infinite shear rate. In other words, the PV is the slope of the shear stress versus shear rate curve of the Bingham plastic model. The PV reflects the type and concentration of the solids in the sealant composition, and a lesser PV is preferred. The PV of the sealant composition may be estimated by measuring the shear stress of the sealant composition using a FANN® Model 35 viscometer at shear rates of 300 rpm and 600 rpm and subtracting the 300 rpm shear stress measurement from the 600 rpm shear stress measurement according to Equation 6.

$$PV = \theta_{600} - \theta_{300}, \tag{6}$$

where:

PV=plastic viscosity (cP), $\theta_{600}$=shear stress viscometer reading at 600 rpm (lbf/100 $ft^2$), $\theta_{300}$=shear stress viscometer reading at 300 rpm (lbf/100 $ft^2$).

The YP represents the shear stress less than which the sealant composition behaves as a rigid body and greater than which sealant compositions flow as a viscous fluid. In other words, the YP represents the amount of stress required to move sealant compositions from a static condition. The yield point is the resistance of initial flow of a fluid, or the stress required in order to move the fluid. It can be simply stated that the yield point is the attractive force among colloidal particles in the resin system mixture. The YP of the sealant composition is correlated with the capacity of the sealant composition to carry rock cuttings through the annulus, which in simplified terms indicates hole-cleaning ability of sealant compositions. The determination of yield points in sealant compositions is important in the overall description of sealant composition flow properties. Yield point affects both the start-up pressure after a temporary shut-down and the void filling properties of sealant compositions during cementing operations. The YP of sealant compositions may be estimated from the PV from Equation 5 by subtracting the PV from Equation 7 from the shear stress of the sealant composition measured at 300 rpm according to Equation 7.

$$YP=\theta_{300}-PV. \tag{7}$$

where YP is expressed as a force per area, such as in field units of $lbf/100\ ft^2$, for example. The YP may be converted to SI units of $dyne/cm^2$, as $1\ lbf/100\ ft^2=4.79\ dyne/cm^2$.

Sealant compositions may include an epoxy resin portion including at least one epoxy resin and at least one diluent. Epoxy resin portions may includes: at least one epoxy resin selected from the group consisting of bisphenol-based epoxy resins, compounds of formula (I), and any combination thereof; and at least one diluent selected from the group consisting of 2,3-epoxypropyl o-tolyl ether, compounds of formula (II), and any combination thereof; wherein at least one of the epoxy resins has an epoxy equivalent weight of from about 170 to about 350 epoxy equivalents per gram; wherein $R^1$ of the compound of formula (I) is an alkyl group, optionally a hexyl group; and/or wherein $R^2$ of the compound of formula (II) is an alkyl group, optionally a C12-C14 alkyl group. Epoxy resin systems may include at least one of 1,6-hexanediol diglycidyl ether epoxy resin, a bisphenol-A epichlorohydrin epoxy resin, a C12-C14 alkyl glycidyl ether reactive diluent, and 2,3-epoxypropyl o-tolyl ether reactive diluent. Epoxy resin system of the present disclosure may include at least one of 1,6-hexanediol diglycidyl ether epoxy resin, a C12-C14 alkyl glycidyl ether reactive diluent, and 2,3-epoxypropyl o-tolyl ether reactive diluent.

Sealant composition of the present disclosure may include an epoxy resin portion including a plurality of epoxy resins and/or a plurality of reactive diluents. Epoxy resin portions may include a combination of bisphenol-A-epichlorohydrin epoxy resin and 1,6-hexanediol diglycidyl ether epoxy resins and a combination of 2,3-epoxypropyl-o-tolyl ether and $C_{12}$-$C_{14}$ alkyl glycidyl ether reactive diluents. Epoxy resins may include a mixture of 1,6-hexanediol diglycidyl ether epoxy resin and bisphenol-A-epichlorohydrin epoxy resin, while the reactive diluent may be either 2,3-epoxyproypl o-tolyl ether or C12-C14 alkyl glycidyl ether. Epoxy resins may include either 1,6-hexanediol diglycidyl ether or bisphenol-A-epichlorohydrin epoxy resin, while the reactive diluent may be a combination of 2,3-epoxyproypl o-tolyl ether and C12-C14 alkyl glycidyl ether.

Epoxy resin portions of the present disclosure may include various combinations of epoxy resins and diluents, e.g., reactive diluents, selected to provide the sealant compositions with a desired epoxy equivalent weight and/or a desired viscosity. Epoxy resin portions of the present disclosure may include a combination of bisphenol-based epoxy resins and reactive diluent C12-C14 alkyl glycidyl ether. Bisphenol-epichlorohydrin epoxy resins of the present disclosure (e.g., bisphenol-A-epichlorohydrin epoxy resins, bisphenol-F-epichlorohydrin epoxy resins, or the like, or any combination thereof) may be modified by blending with a reactive diluent (e.g., a C12-C14 alkyl glycidyl ether) to reduce the viscosity of the resin and/or improve the adhesion, flexibility, and solvent resistance of the final resin. A bisphenol-A-epichlorohydrin epoxy resin may be modified with a reactive diluent C12-C14 alkyl glycidyl ether to modify the viscosity of the sealant compositions and/or to provide the sealant composition with a non-crystalizing resin and improved mechanical and chemical resistance compared to compositions without either the bisphenol-A-(epichlorohydrin) epoxy resin or without the reactive diluent C12-C14 alkyl glycidyl ether.

Epoxy resin portions may include from about 80 wt % to about 90 wt %, including all wt % values and subsets therebetween, of bisphenol-A-epichlorohydrin epoxy resin based on the total weight of the epoxy resin portion (e.g., from 80 wt % to 88 wt %, from 80 wt % to 86 wt %, from 80 wt % to 84 wt %, from 82 wt % to 90 wt %, from 82 wt % to 88 wt %, from 82 wt % to 86 wt %, from 82 wt % to 84 wt %, from 84 wt % to 90 wt %, from 84 wt % to 88 wt %, or from 84 wt % to 86 wt %). Epoxy resin portions may further include from 10 wt % to 20 wt %, including all wt % values and subsets therebetween, of C12-C14 alkyl glycidyl ether, based on the total weight of the epoxy resin portion (e.g., from 10 wt % to 18 wt %, from 10 wt % to 16 wt %, from 10 wt % to 14 wt %, from 12 wt % to 20 wt %, from 12 wt % to 18 wt %, from 12 wt % to 16 wt %, from 12 wt % to 14 wt %, from 14 wt % to 20 wt %, from 14 wt % to 18 wt %, or from 14 wt % to 16 wt %.

Epoxy resins may include the bisphenol-A-(epichlorohydrin) epoxy resin and the reactive diluent C12-C14 alkyl glycidyl ether, and the combination may have an epoxy value of from 4.76 epoxy equivalents per kilogram of epoxy resin to 5.26 epoxy equivalents per kilogram of epoxy resin. Epoxy resins comprising the bisphenol-A-(epichlorohydrin) epoxy resin with the reactive diluent C12-C14 alkyl glycidyl ether may have an epoxy equivalent weight of 190 g/eq to 210 g/eq and a dynamic viscosity of from 600 millipascal seconds (mPa·s) to 1200 mPa·s, or 600 mPa-s to 900 mPa·s. Epoxy resins of the present disclosure may include a combination of an epoxy resin and reactive diluent C12-C14 alkyl glycidyl ether, which may have an epoxy equivalent weight of from 270 g/eq to 305 g/eq and may exhibit a dynamic viscosity of from 5 mPa·s to 12 mPa·s. Epoxy resin systems of the present disclosure may include a combination of an epoxy resin and the reactive diluent 2,3-epoxypropyl-o-tolyl ether, and the combination may have an epoxy equivalent weight of from 170 g/eq to 190 g/eq and exhibit a dynamic viscosity of from 7 mPa·s to 10 mPa·s.

Sealant compositions of the present disclosure may include any epoxy portion of the present disclosure and any curing agent of the present disclosure. Epoxy resin systems may include from about 20 wt % to about 97 wt % of bisphenol-A-epichlorohydrin epoxy resin and reactive diluent C12-C14 alkyl glycidyl ether, and from about 1 wt % to about 20 wt % TEPA curing agent, based on the total weight of the sealant composition. Epoxy resin systems may include from about 10 wt % to about 80 wt % bisphenol-A-epichlorohydrin epoxy resin and reactive diluent C12-C14 alkyl glycidyl ether, and from about 10 wt % to about 80 wt % 1,6-hexanediol diglycidyl ether, and from about 1 wt % to about 20 wt % TEPA curing agent, based on the total weight of the sealant composition.

Solidified Sealant Compositions

Sealant compositions of the present disclosure may generate a flexible, highly elastic material capable of deformation with shape memory or a hard, rigid, cement-like material. Whether sealant compositions are cured to a semi-solid or a solid state, the solidified sealant compositions are capable of sealing the annulus of a wellbore, preventing fluid loss into lost circulation zones of a subterranean formation connected to the wellbore, or any combination thereof.

Solidified sealant compositions of the present disclosure may be capable of withstanding a wide range of temperatures and pressures without failing or deteriorating. Failure or deterioration of the solidified sealant compositions may allow liquids or gases to penetrate into or through the solidified sealant compositions. For example, the sealant composition, once solidified, may be capable of withstanding temperatures of from about 20 degrees Celsius (° C.) to about 205° C. The solidified sealant compositions may also be able to withstand temperature cycling within said temperature range. Solidified sealant composition of the present disclosure may also be capable of withstanding pressures of up to 4,000,000 pounds of force per square inch (psi) (1 psi equals 6.89476 kilopascals (kPa)). For example, solidified sealant compositions may be capable of withstanding pressures of from 14 psi to 4,000,000 psi without failing or deteriorating to allow liquids or gases to penetrate into or through the sealant composition.

Subterranean Operation Fluids

In an aspect, the present disclosure provides a subterranean operation fluid including sealant compositions of the present disclosure, or one or more components thereof. A subterranean operation fluid may be selected from the group consisting of an aqueous-based drilling fluid, an oil-based drilling fluid, a drilling pill, a cementing fluid, and any combination thereof. Subterranean operation fluids may be drilling fluids comprising a base fluid and a sealant composition of the present disclosure. Sealant compositions of the present disclosure may be included in a subterranean operation fluid in an amount of about 5 wt % to about 100 wt %, including all wt % values and subsets therebetween (e.g., about 5 wt. % to about 99 wt. %, or about 10 wt. % to about 95 wt. % or about 15 wt. % to about 90 wt. % or about 20 wt. % to about 85 wt. %, or about 25 wt. % to about 80 wt. %, or about 5 wt. % to about 10 wt. %, or about 10 wt. % to about 15 wt. %, or about 15 wt. % to about 20 wt. %, or about 20 wt. % to about 25 wt. %, or about 25 wt. % to about 30 wt. %, or about 30 wt. % to about 35 wt. %, or about 35 wt. % to about 40 wt. %, or about 40 wt. % to about 45 wt. %, or about 45 wt. % to about 50 wt. %, or 50 wt. % to about 55 wt. %, or about 55 wt. % to about 60 wt. %, or about 60 wt. % to about 65 wt. %, or about 65 wt. % to about 70 wt. %, or about 70 wt. % to about 75 wt. %, or about 75 wt. % to about 80 wt. %, or about 80 wt. % to about 85 wt. %, or about 85 wt. % to about 90 wt. %, or about 90 wt. % to about 95 wt. %, or about 95 wt. % to about 100 wt. %). Subterranean operation fluids of the present disclosure may have good properties, such as suitable rheology (e.g., pumpability, delayed thickening time, or the like), suitable for use in a subterranean operation of the present disclosure Methods Related to Sealant Compositions In an aspect, the present disclosure provides methods of making and/or using sealant compositions, subterranean operation fluids comprising said sealant compositions or components thereof, or any combination thereof. Methods may comprise making and/or using any sealant composition, subterranean operation fluid (e.g., a drilling fluid, a drilling pill, a cementing fluid, the like, or any combination thereof) comprising said sealant compositions or components thereof, or any combination thereof, of the present disclosure. Methods may comprise performance of any subterranean operation of the present disclosure (e.g., a drilling operation, a cementing operation, the like, or any combination thereof). Methods of using said sealant compositions may include: introducing a sealant composition into a wellbore; wherein the sealant composition comprises an epoxy system comprising an epoxy portion comprising at least one epoxy resin and a curing agent portion comprising at least one curing agent; and red mud; and allowing the sealant composition to cure. Sealant compositions may exclude an aqueous carrier fluid. Sealant compositions may exclude an alkaline silicate, e.g., an alkali metal silicate.

Sealant compositions may be lost circulation material (LCM) compositions. Methods may comprise introducing an LCM composition into a zone of interest within a subterranean formation via the wellbore, and allowing the LCM composition to cure therein. As used herein, the term "zone of interest," and grammatical variants thereof, refers to a location within a subterranean formation connected via the wellbore, e.g., a depleted zone, a zone of low pressure, a lost circulation zone, a fracture zone, or any combination thereof. Methods may comprise using the LCM composition to control fluid loss from the wellbore into the subterranean formation during any subterranean operation of the present disclosure.

Methods may comprise performing a drilling operation using a drilling fluid comprising a sealant composition of the present disclosure. During typical drilling operations, a drilling fluid of the present disclosure is continuously pumped into a wellbore penetrating a subterranean formation to lubricate the drill bit and also to clear and clean the wellbore and the filings (also referred to as "cuttings") resulting from drilling. The drilling fluid is then typically pumped from a mud pit into the wellbore and returns again to the surface. An indication that a depleted zone, zone of low pressure, lost circulation zone, or fractured zone has been encountered is when the flow rate of the drilling fluid that returns to the surface is less than the flow rate of the drilling fluid pumped into the wellbore. This reduction or absence of returning drilling fluid is referred to as lost circulation in the context of a drilling operation.

Drilling fluids comprising the sealant compositions of the present disclosure may be used for drilling all or portions of a wellbore. For example, sealant compositions of the present disclosure may be added to the drilling fluid when a depleted zone, a zone of low pressure, a lost circulation zone, or a fractured zone is encountered. Fractured zones may include fractures that are natural or induced, vugular or cavernous, highly permeable, or unconsolidated. Alternatively, sealant compositions of the present disclosure may be included in the drilling fluid regardless of encountering a depleted zone, a zone of low pressure, a lost circulation zone, or a fractured zone.

Drilling fluid, when introduced into the wellbore, will enter a zone of interest, wherein the zone of interest, for example, may be a depleted zone, a zone of low pressure, a lost circulation zone, a fracture zone, or any combination thereof. Activated sealant compositions of the present disclosure may cure or otherwise polymerize to form solidified sealant compositions therein. Heat may be applied to the zone of interest solely due to natural downhole temperatures, thereby increasing the temperature of the activated sealant compositions and accelerating the transition of the activated sealant compositions into solidified sealant compositions in the zone of interest. Heat may additionally be applied to the zone of interest from an external heat source such as a downhole heater (e.g., an immersion heater or a circulation heater).

FIG. 1 illustrates a non-limiting example of a well site 100 having a wellbore 102 through the Earth's surface 104 into a subterranean formation 106 in the Earth's crust. To form the wellbore 102, a hole (i.e., a borehole) may be drilled into the subterranean formation 106 to generate a drilled formation surface 108 as an interface for the wellbore 102 with the subterranean formation 106. The formation surface 108 may be characterized as the wellbore 102 wall. The wellbore 102 may have open hole portions but generally includes a drill string 110. The wellbore 102 in the depicted implementation of FIG. 1 may be a cased wellbore 102.

In this nonlimiting example, the wellbore 102 has a lost circulation zone 112 in the subterranean formation 106 at that portion of the wellbore 102. The lost circulation zone 112 causes or contributes to the lost circulation of a fluid 114 (i.e., in this case, a drilling fluid) into the subterranean formation 106. The lost circulation zone 112 has structural features or characteristics which may include, but are not limited to, fractures, voids, vugulars (i.e., vugs), gaps, permeable channels, cavities, cavernous openings, the like, and any combination thereof.

The fluid 114 is introduced from the Earth's surface 104 by flowing downward through the drill string 110 and is discharged from the drill bit as drilling proceeds, and then flows upward through the annulus between the subterranean formation 106 and the drill string 110 toward the Earth's surface 104 as a return fluid. Some or all of the fluid 114 flowing upward through the annulus may be lost through the lost circulation zone 112 into the subterranean formation 106.

The sealant compositions of the present application may be utilized to treat the lost circulation zone 112 to mitigate (e.g., prevent or reduce) a flow of fluids from the wellbore into the subterranean formation. A fluid 116 (i.e., a drilling fluid) comprising the sealant compositions of the present application may be introduced (e.g., pumped) into the wellbore 102.

Figure 1B:
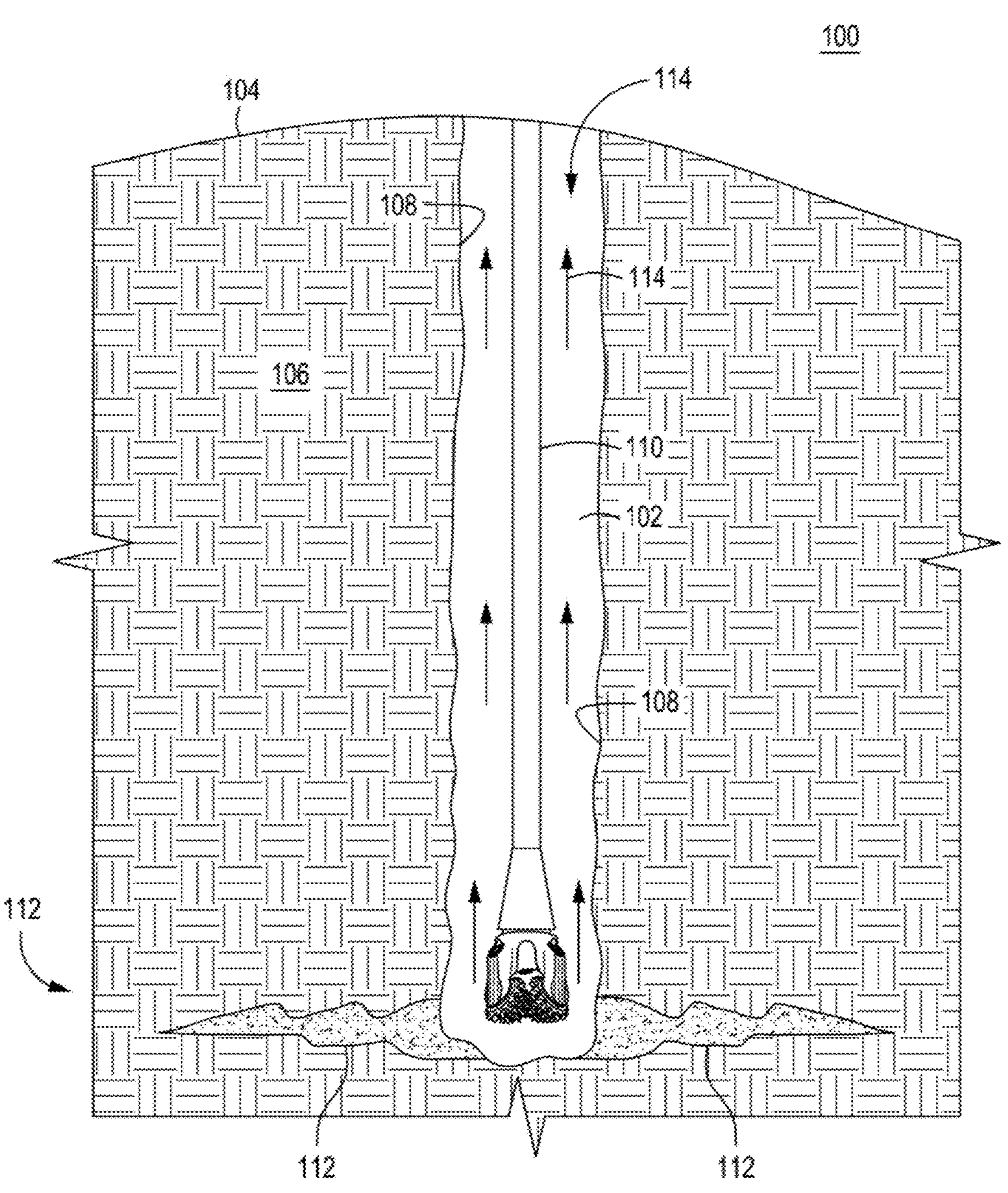

FIG. 1B illustrates a non-limiting example of the same well site 100 as described for FIG. 1A, except that sealant compositions of the present application are utilized to treat the lost circulation zone 112 to mitigate (e.g., prevent or reduce) the flow of fluid 114 from the wellbore 102 into the subterranean formation 106. In such cases, sealant compositions of the present application may be added directly to the fluid 114 to be introduced (e.g., pumped) into wellbore 102.

Once sealant compositions enter the lost circulation zone 112, e.g., via fluid 114, the sealant compositions may be heated to accelerate setting (e.g., curing or polymerization) of the sealant compositions. For example, sealant compositions may be heated to formation temperature conditions as disclosed herein.

Mitigating the flow of liquid from the wellbore may correspond to mitigating the flow of a negligible volume of or all of the volume of the liquid from the wellbore. Mitigation of the flow of fluids may be referred to herein as a "fluidic seal," in which a barrier is formed to the flow of fluids (e.g., drilling fluids or other fluid types). A fluidic seal may form a barrier having a permeability of less than about 0.1 darcies, including complete sealing such that no fluid passes through the fluidic seal.

Optionally, the sealant compositions may include a component (or additive), as described herein for the breakdown and removal of at least a portion of the fluidic seal. As used herein, the term "at least a portion," with reference to the breakdown and removal of the fluidic seal, and grammatical variants thereof, refers to restoring the zone of interest (e.g., lost circulation features of 114 of FIG. 1) in which the fluidic seal was formed to a permeability no less than about 75% of the original permeability of the target zone.

Methods may further include one or more preparation steps for one or more components of the sealant compositions prior to introducing the sealant compositions to the zone of interest. Preparation steps may include blending at least a portion of the epoxy resin with at least one diluent. Preparation steps may include blending at least a portion of the epoxy resin with at least a portion of the curing agent. Preparation steps may include blending and/or impregnating at least a portion of the red mud with at least a portion of each of the other components of the sealant composition.

Introducing the sealant compositions to the zone of interest may include forming the sealant composition prior to introducing the sealant composition to the zone of interest. Introducing the sealant compositions to the zone of interest may include separately introducing at least one component of the sealant compositions to the zone of interest prior to, concurrently with, or after any other components of the sealant compositions, such that the entire sealant composition is not formed prior to introduction of each of the components to the wellbore and/or to the zone of interest. Introducing the sealant compositions to the zone of interest may include introducing at least one subterranean operation fluid selected from the group consisting of an aqueous-based drilling fluid, an oil-based drilling fluid, a drilling pill, a cementing fluid, and any combination thereof, to the zone of interest, where each component of the sealant compositions is comprised in at least one of the subterranean operation fluids. A single subterranean operation fluid may comprise all components of a sealant composition, which may be prepared prior to or during preparation of the subterranean operation fluid. At least one component of the sealant compositions may be separately included in a different subterranean operation fluid from any of the other components, such that the sealant composition is not formed prior to introduction of each of the different subterranean operation fluids to the wellbore and/or the zone of interest.

Cementing Operations

Sealant compositions of the present disclosure may be cementing compositions. In a cementing operation, a fluid 116 (i.e., in this case, a cementing fluid or cementing slurry) may be introduced from the Earth's surface 104 by flowing downward through the casing 110 and drill string (not shown), may be discharged from the drill bit (not shown) at the bottom of the wellbore 102, and may flow upward through the annulus between the subterranean formation 106 and the casing 110 toward the surface 104, and may cure into a cement sheath therein. Some or all of the fluid 116 flowing upward through the annulus may be lost through the features 114 into the subterranean formation 106 at the lost circulation zone 112 in the wellbore 102. Sealant compositions of the present application may be utilized to form a cement sheath within the annulus, to treat the lost circulation zone 112 to mitigate (e.g., prevent or reduce) a flow of fluids from the wellbore into the subterranean formation, or any combination thereof. A fluid 116 (i.e., a cementing fluid or cementing slurry) comprising the sealant compositions of the present application may be introduced (e.g., pumped) into the wellbore 102 in a same or different manner than described above for drilling operations.

Other technical features may be readily apparent to one skilled in the art from the following figures, descriptions, and claims.

Embodiments disclosed herein include:

Embodiment 1. A method comprising: introducing into a wellbore within a subterranean formation a sealant composition consisting essentially of: red mud; at least one epoxy resin; optionally, at least one diluent; at least one curing agent; optionally, at least one curing accelerator and/or curing retarding agent; optionally, an emulsifier; and optionally, a weighting agent; and allowing the sealant composition to cure to form a solidified sealant composition.

Embodiment 2. The method of Embodiment 1, wherein the sealant composition is a lost circulation material (LCM) composition; wherein the LCM composition is introduced into a zone of interest within the subterranean formation via the wellbore; wherein the zone of interest is selected from the group consisting of a depleted zone, a zone of low pressure, a lost circulation zone, a fracture zone, and any combination thereof; and wherein the LCM composition is cured within the lost circulation zone.

Embodiment 3. The method of Embodiment 1, wherein the sealant composition is a cementing composition; wherein the cementing composition is introduced into an annulus between the wall of the wellbore and a casing disposed therein; and wherein the cementing composition is cured within the annulus.

Embodiment 4. The method of any one of Embodiments 1-3, wherein the red mud comprises particles, of which 80% by volume have an average particle size of less than 50 microns (μm); wherein the red mud comprises from 20 weight percent (wt %) to 40 wt % of sodium, based on the total elemental composition of the red mud; wherein the red mud comprises a $Al_2O_3$ basis/$SiO_2$ basis of from about 1/1 to about 3/1, based on the total elemental composition of the red mud; and/or wherein the med mud is present in the cementing composition at from 0.1 wt % to 50 wt %, based on the total weight of the cementing composition.

Embodiment 5. The method of any one of Embodiments 1-4, wherein the at least one epoxy resin comprises a component selected from a group consisting of: bisphenol-epichlorohydrin epoxy resins; novolak epoxy resins; compounds having formula (I): $[(OC_2H_3)—CH_2—O]_x—R^1$, (I), wherein $R^1$ is a hydrocarbyl group comprising from 6 carbon atoms to 24 carbon atoms, and wherein x is ≥2; derivatives thereof; and any combination thereof; and/or wherein the at least one epoxy resin is present in the sealant composition at from 20 weight percent (wt %) to 99 wt %, based on the total weight of the sealant composition.

Embodiment 6. The method of any one of Embodiments 1-5, wherein the epoxy resin portion further comprises a diluent, wherein the diluent comprises at least one component selected from the group consisting of: compounds having formula (I): $[(OC_2H_3)—CH_2—O]_x—R^1$, (I), wherein $R^1$ is a hydrocarbyl group comprising 2 carbon atoms to 5 carbon atoms, and wherein x is ≥2; compounds having formula (II): $(OC_2H_3)—CH_2—R^2$, (II), where $R^2$ is a hydrocarbyl group comprising 4 carbon atoms to 24 carbon atoms; derivatives thereof; and any combination thereof; and/or wherein the diluent is present at from 1 weight percent (wt %) to 10 wt %, based on the total weight of the epoxy resin portion.

Embodiment 7. The method of any one of Embodiments 1-6, wherein the curing agent comprises at least one component selected from the group consisting of amines, polyamines, amine adducts, polyamine adducts, alkanolamines, polyetheramines, amides, polyamides, polyamide adducts, amidoamines, polyamidoamines, phenalkamine, imidazoles, and any combination thereof; and/or wherein the curing agent is present in the sealant composition at from 0.1 weight percent (wt %) to 30 wt %, based on the total weight of the sealant composition.

Embodiment 8. The method of any one of Embodiments 1-7, wherein the sealant composition excludes the emulsifier and the weighting agent.

Embodiment 9. The method of any one of Embodiments 1-7, wherein the sealant composition comprises the emulsifier and/or the weighting agent; and wherein the emulsifier comprises a component selected from a group consisting of alkoxylated alkylphenols; alkoxylated phenols; alkylphenols; fatty acids; fatty amides; polyolefin amide alkenamines; lecithins; glycolic acid alkoxylate alkenyl ethers; glycols; phosphate esters; ethanolamines; N,N-bis(hydroxyethyl) fatty amides; derivatives thereof; and any combination thereof; wherein the emulsifier is present in the sealant composition at from 0.1 weight percent (wt %) to 30 wt %, based on the total weight of the sealant composition; wherein the weighting agent comprises a component selected from a group consisting of sand, barite, hematite, calcium carbonate, siderite, ilmenite, silica, manganese oxide, hausmannite, manganese tetraoxide, zinc oxide, zirconium oxide, fly ash, and any combination thereof; and/or wherein the weighting agent is present in the sealant composition at from 0.1 weight percent (wt %) to 40 wt %, based on the total weight of the sealant composition.

Embodiment 10. The method of any one of Embodiments 1-9, wherein the sealant composition has a thickening time at 68 degrees Fahrenheit (° F.) of from one (1) hour to ten (10) hours; and/or wherein the sealant composition has a setting time of four (4) hours to 40 hours at a temperature of 120° F.

Embodiment 11. The method of any one of Embodiments 1-10, wherein the method further comprises, prior to introducing the sealant composition, pre-mixing the components of the sealant composition.

Embodiment 12. The method of any one of Embodiments 1-11, wherein introducing the sealant composition comprises introducing at least one subterranean operation fluid, wherein the at least one subterranean operation fluid is selected from the group consisting of a drilling fluid, a drilling pill, a cementing slurry, and any combination thereof; wherein the at least one subterranean operation fluid, taken together, comprise each of the components of the sealant composition; and wherein each component of the sealant composition is comprised in the same subterranean operation fluid, or wherein at least two components of the sealant composition are comprised in at least two different subterranean operation fluids.

Embodiment 13. A sealant composition consisting essentially of: a red mud; at least one epoxy resin; optionally, at least one diluent; at least one curing agent; optionally, at least one curing accelerator and/or curing retarding agent; optionally, an emulsifier; and optionally, a weighting agent.

Embodiment 14. The sealant composition of Embodiment 13, wherein the at least one epoxy resin comprises a component selected from a group consisting of: bisphenol-epichlorohydrin epoxy resins; novolak epoxy resins; compounds having formula (I): $[(OC_2H_3)—CH_2—O]_x—R^1$, (I), wherein $R^1$ is a hydrocarbyl group comprising from 6 carbon atoms to 24 carbon atoms, and wherein x is ≥2; derivatives thereof; and any combination thereof; and/or wherein the at least one epoxy resin is present in the sealant composition at from 20 weight percent (wt %) to 99 wt %, based on the total weight of the sealant composition.

Embodiment 15. The sealant composition of Embodimeint 13 or Embodiment 14, wherein the epoxy resin portion further comprises a diluent; wherein the diluent comprises at least one component selected from the group consisting of: compounds having formula (I): $[(OC_2H_3)—CH_2—O]_x—R^1$, (I), wherein $R^1$ is a hydrocarbyl group comprising 2 carbon atoms to 5 carbon atoms, and wherein x is ≥2; compounds having formula (II): $(OC_2H_3)—CH_2—R^2$, (II), where $R^2$ is a hydrocarbyl group comprising 4 carbon atoms to 24 carbon atoms; derivatives thereof; and any combination thereof; and/or wherein the diluent is present at from 1 weight percent (wt %) to 10 wt %, based on the total weight of the epoxy resin portion.

Embodiment 16. The sealant composition of any one of Embodiments 13-15, wherein the curing agent comprises at least one component selected from the group consisting of amines, polyamines, amine adducts, polyamine adducts, alkanolamines, polyetheramines, amides, polyamides, polyamide adducts, amidoamines, polyamidoamines, phenalkamine, imidazoles, and any combination thereof; and/or wherein the curing agent is present in the sealant composition at from 0.1 weight percent (wt %) to 30 wt %, based on the total weight of the sealant composition.

Embodiment 17. The sealant composition of any one of Embodiments 13-16, wherein the red mud comprises particles, of which 80% by volume have an average particle size of less than 50 microns (μm); wherein the red mud comprises from 20 weight percent (wt %) to 40 wt % of sodium, based on the total elemental composition of the red mud; wherein the red mud comprises a $Al_2O_3$ basis/$SiO_2$ basis of from about 1/1 to about 3/1, based on the total elemental composition of the red mud; and/or wherein the med mud is present in the cementing composition at from 0.1 wt % to 50 wt %, based on the total weight of the cementing composition.

Embodiment 18. The sealant composition of any one of Embodiments 13-17, wherein the sealant composition excludes the emulsifier and the weighting agent.

Embodiment 19. The sealant composition of any one of Embodiments 13-17, wherein the sealant composition comprises the emulsifier and/or the weighting agent, and wherein the emulsifier comprises a component selected from a group consisting of alkoxylated alkylphenols; alkoxylated phenols; alkylphenols; fatty acids; fatty amides; polyolefin amide alkenamines; lecithins; glycolic acid alkoxylate alkenyl ethers; glycols; phosphate esters; ethanolamines; N,N-bis(hydroxyethyl) fatty amides; derivatives thereof; and any combination thereof; wherein the emulsifier is present in the sealant composition at from 0.1 weight percent (wt %) to 30 wt %, based on the total weight of the sealant composition; wherein the weighting agent comprises a component selected from a group consisting of sand, barite, hematite, calcium carbonate, siderite, ilmenite, silica, manganese oxide, hausmannite, manganese tetraoxide, zinc oxide, zirconium oxide, fly ash, and any combination thereof; and/or wherein the weighting agent is present in the sealant composition at from 0.1 weight percent (wt %) to 40 wt %, based on the total weight of the sealant composition.

Embodiment 20. The sealant composition of any one of Embodiments 13-19, wherein the sealant composition has a thickening time at 68 degrees Fahrenheit (° F.) of from one (1) hour to ten (10) hours; and/or wherein the sealant composition has a setting time of four (4) hours to 40 hours at a temperature of 120° F.

To facilitate a better understanding of the aspects of the present disclosure, the following examples of preferred or representative aspects are given. In no way should the following examples be read to limit, or to define, the scope of the disclosure.

EXAMPLES

Example 1: Chemical Analysis of the Red Mud Sample

Wavelength Dispersive X-ray Fluorescence (WDXRF) may be used to conduct elemental analysis. In WDXRF spectrometers, all of the elements in the sample are excited simultaneously. The different energies of the characteristic radiation emitted from the sample are diffracted into different directions by an analyzing crystal or monochrometer (similar to the action of a prism dispersing different colors of visible light into different directions). By placing the detector at a certain angle, the intensity of X-rays with a certain wavelength can be measured. Sequential spectrometers use a moving detector on a goniometer to move it through an angular range to measure the intensities of many different wavelengths. Simultaneous spectrometers are equipped with a set of fixed detection systems, where each system measures the radiation of a specific element.

For the WDXRF analysis, a sample of red mud was homogenized and manually grounded by an agate mortar and a pestle for several minutes to achieve fine particle size. Then, 4 grams of the red mud powder was mixed well and homogenized with 0.9 grams of a binder (Licowax C micropowder PM (Hoechstwax)). Then, the powder was pressed with 20 tons of pressure to a pellet with a 31 millimeter (mm) diameter. WDXRF analysis was then performed on the sample using the standardless Omnian 27 method. The WDXRF compositions of ten (10) different samples of the red mud are shown in Table 1 to be presented.

TABLE 1

| | Sample # (wt %) | | | | | | | | | | |
|---|---|---|---|---|---|---|---|---|---|---|---|
| Element | 1 | 2 | 3 | 4 | 5 | 6 | 7 | 8 | 9 | 10 | Average |
| O | 33.900 | 33.800 | 33.700 | 33.900 | 33.900 | 33.800 | 33.800 | 33.960 | 33.900 | 33.900 | 33.856 |
| Na | 33.300 | 33.500 | 33.600 | 33.800 | 33.870 | 33.740 | 33.670 | 33.800 | 33.500 | 33.500 | 33.628 |
| Fe | 11.900 | 11.800 | 11.300 | 11.470 | 11.340 | 11.530 | 11.600 | 11.440 | 11.600 | 11.620 | 11.560 |
| Al | 6.600 | 6.700 | 6.800 | 6.740 | 6.830 | 6.720 | 6.750 | 6.720 | 6.729 | 6.850 | 6.744 |
| Si | 3.780 | 3.800 | 3.900 | 3.890 | 3.920 | 3.915 | 3.906 | 3.890 | 3.913 | 3.932 | 3.887 |
| Ca | 3.100 | 3.100 | 3.000 | 3.037 | 3.010 | 3.053 | 3.080 | 3.060 | 3.104 | 3.036 | 3.058 |
| Ti | 3.000 | 3.000 | 3.000 | 2.990 | 2.970 | 2.972 | 2.980 | 3.020 | 2.984 | 3.024 | 2.994 |
| S | 2.100 | 2.000 | 2.100 | 2.090 | 2.100 | 2.124 | 2.080 | 2.087 | 2.167 | 2.094 | 2.094 |
| F | 0.800 | 0.800 | 1.000 | 0.980 | 0.960 | 1.100 | 0.954 | 0.944 | 0.963 | 0.917 | 0.942 |
| Cl | 0.300 | 0.400 | 0.400 | 0.403 | 0.370 | 0.390 | 0.396 | 0.385 | 0.411 | 0.424 | 0.388 |
| Sr | 0.100 | 0.100 | 0.142 | 0.140 | 0.139 | 0.140 | 0.142 | 0.142 | 0.142 | 0.142 | 0.133 |
| Zr | 0.100 | 0.100 | 0.135 | 0.132 | 0.130 | 0.130 | 0.132 | 0.132 | 0.131 | 0.131 | 0.125 |
| P | 0.090 | 0.090 | 0.097 | 0.092 | 0.095 | 0.090 | 0.097 | 0.096 | 0.100 | 0.096 | 0.094 |
| Mg | 0.070 | 0.080 | 0.074 | 0.068 | 0.070 | 0.072 | 0.070 | 0.077 | 0.073 | 0.073 | 0.073 |
| Cr | 0.060 | 0.050 | 0.058 | 0.057 | 0.060 | 0.060 | 0.058 | 0.057 | 0.058 | 0.057 | 0.058 |

The WDXRF results show that the sample consisted of mainly O and Na with appreciable amounts of Fe, Al, Si, Ca, and Ti. Further, the sample comprises about 45.33 wt % of a $Na_2O$ basis, about 16.53 wt % of a $Fe_2O_3$ basis, about 12.74 wt % of a $Al_2O_3$ basis, about 8.32 wt % of a $SiO_2$ basis, about 4.28 wt % of a CaO basis, and about 5.00 wt % of a $TiO_2$ basis.

The red mud sample has particles, of which 80% by volume have an average particle size of less than 50 μm.

Example 2: Formulation and Testing of Sealant Compositions

Table 2 shows possible epoxy resins and diluents for testing.

TABLE 2

| Epoxy Resin/ Diluent ID# (Tradename) | Epoxy Resin/Diluent Chemical Composition |
|---|---|
| 1 (RAZEEN 2254) | bisphenol-A-epichlorohydrin epoxy resin with the reactive diluent C12-C14 alkyl glycidyl ether |
| 2 | 2,3-epoxypropyl-o-tolyl ether |
| 3 (RAZEEN 7106) | C12-C14 alkyl glycidyl ether |
| 4 | 1,6-hexanediol diglycidyl ether |
| 5 (WellLock R1) | Bisphenol A/Epichlorohydrin resin and butyl glycidyl ether |
| 6 | Bisphenol A/Epichlorohydrin and butyl glycidyl ether and cyclohexanedimethanol diglycidyl ether |
| 7 (WellLock R2) | Cyclohexanedimethanol diglycidyl ether |

Table 3 shows possible curing agents for testing.

TABLE 3

| Curing Agent ID | Chemical Composition |
|---|---|
| 1 (RAZEEN CURE 931) | 90-100% Diethylenetriamine |
| 2 (Well Lock H1) | Diethyltoluenediamine |
| 3 (Well Lock H2) | Polyoxypropylene Diamine |

Possible emulsifying agents for testing may include oxyethylated alkyl phenol, carboxylic acid terminated fatty polyamide in biodiesel base, modified amidoamine, polyolefin amide alkeneamine, lecithin liquid dispersion, refined tall oil fatty acid (TOFA), 2/3-Amide of TOFA and polyamines, carboxylic acid terminated fatty polyamide w/C16-18 internal olefin (IO), blend of oxidized tall oil and polyaminated fatty acid, polyaminated fatty acid, their salts, or any combination.

Tables 4 and 5 show selected test formulations.

TABLE 4

| Formulation#1 | | |
|---|---|---|
| Additive | wt % | Weight (g) |
| Resin 1: Razeen ® 2254 | 100% | 100 g |
| Curing Agent 1: Razeen ® Cure-931 | 2.5% | 2.5 g |
| Red Mud | 16% | 16 g |
| Density | 74 pcf | |

TABLE 5

| Formulation#2 | | |
|---|---|---|
| Additive | wt % | Weight (g) |
| Resin 1: Razeen ® 2254 | 100% | 100 g |
| Curing Agent 1: Razeen ® Cure-931 | 4% | 4 g |
| Red Mud | 9.5% | 9.5 g |
| Density | | 72 pcf |

Table 6 shows rheology testing of Formulation 1.

TABLE 6

| Rheology | Formulation 1 |
|---|---|
| 300 | Out of range |
| 200 | Out of range |
| 100 | Out of range |
| 60 | 207 |
| 30 | 109 |
| 6 | 27 |
| 3 | 15 |
| 10 s | 15 |
| 10 MIN | 15 |
| Note | At room temperature |

Table 7 shows the thickening time and setting time for Formulations 1 and 2 at room temperature according to visual observation.

TABLE 7

| Test sample | Thickening Time (to gelling, viscous, un-pumpable state) | Curing Time (to complete rigid material) |
|---|---|---|
| Formulation 1 | 8 hours | 35 hours |
| Formulation 2 | 4 hours | 7-8 hours |

Figure 2:
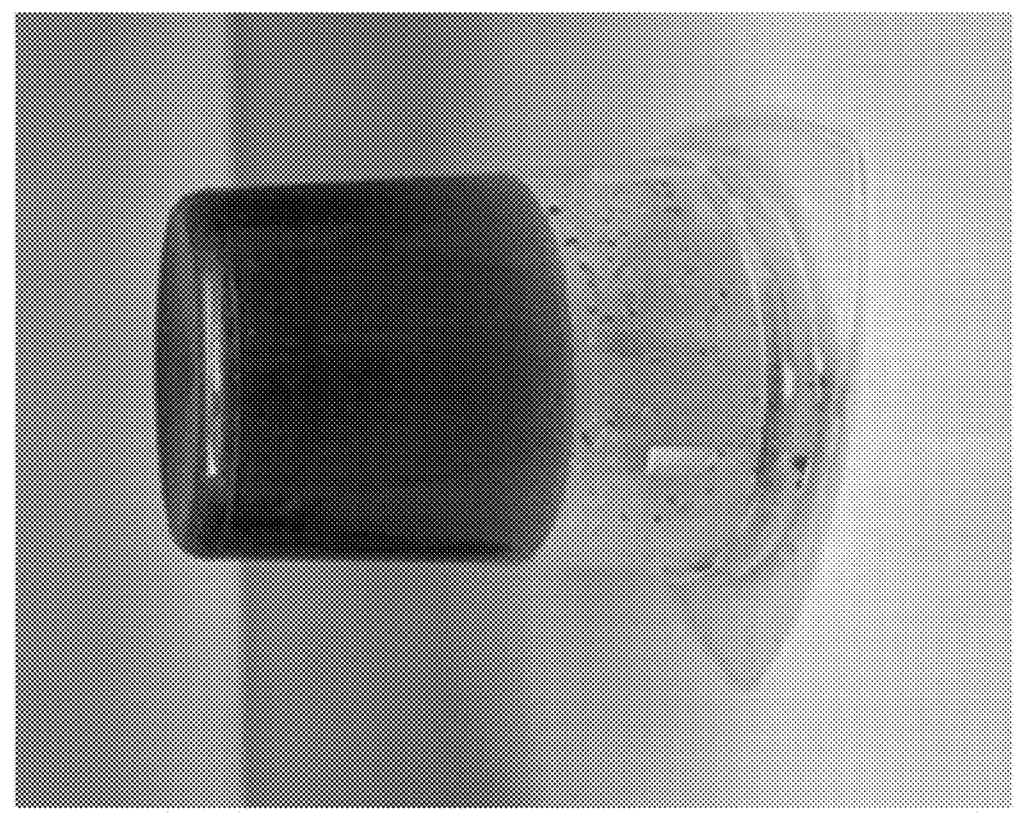
FIG. 2 shows the epoxy resin system-red mud-based sealant composition from Table 6 comprising 9.5 weight percent (wt %) red mud, shown before setting (left) and after thickening (right), indicating strong gelling.
Figure 2:
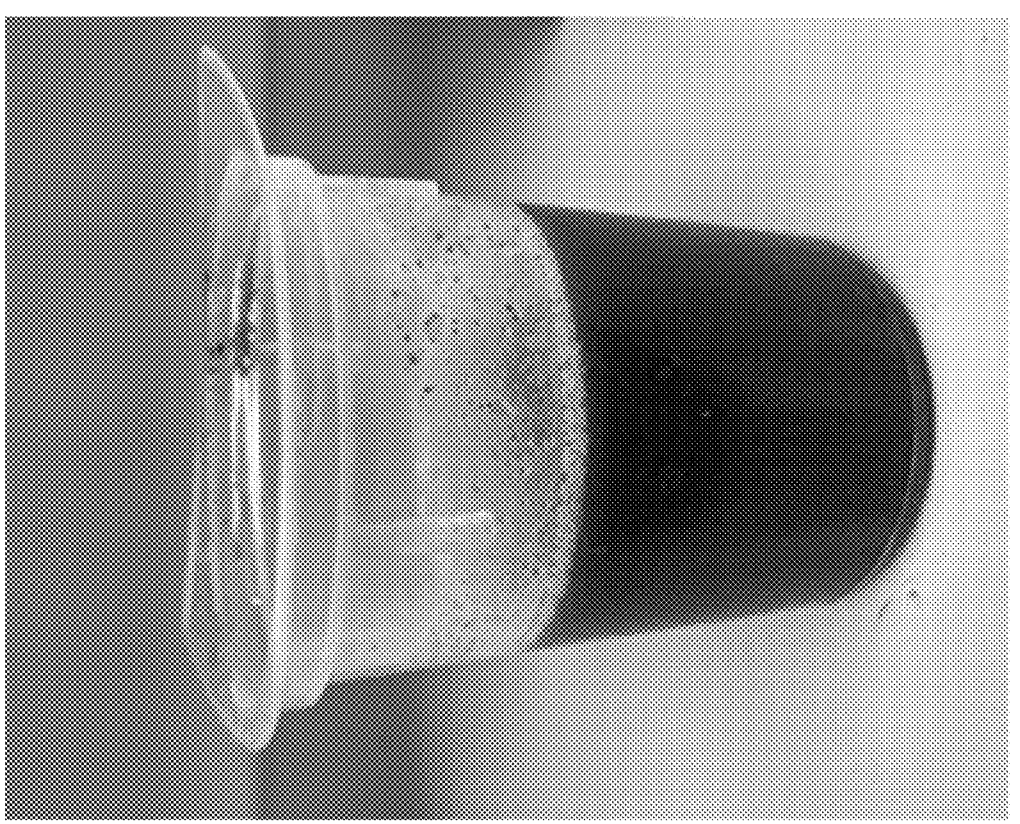
Figure 3:
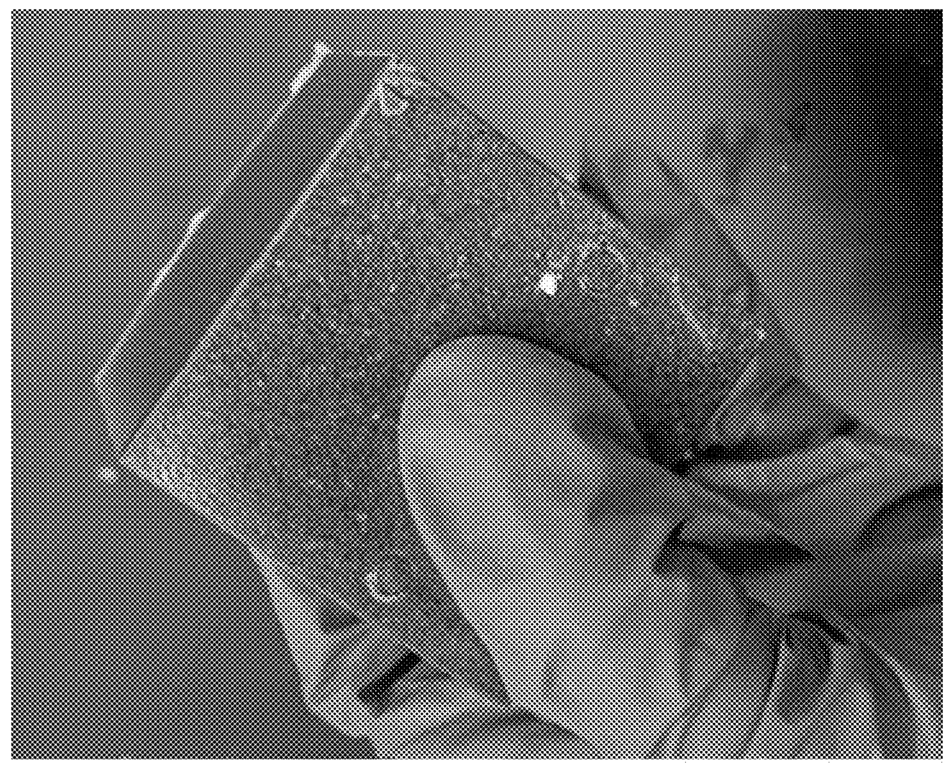
FIG. 3 shows the thickened composition of FIG. 2 after heating in a water bath (120° F.) for 24 hours, indicating curing into a hard rigid material.
Figure 3:
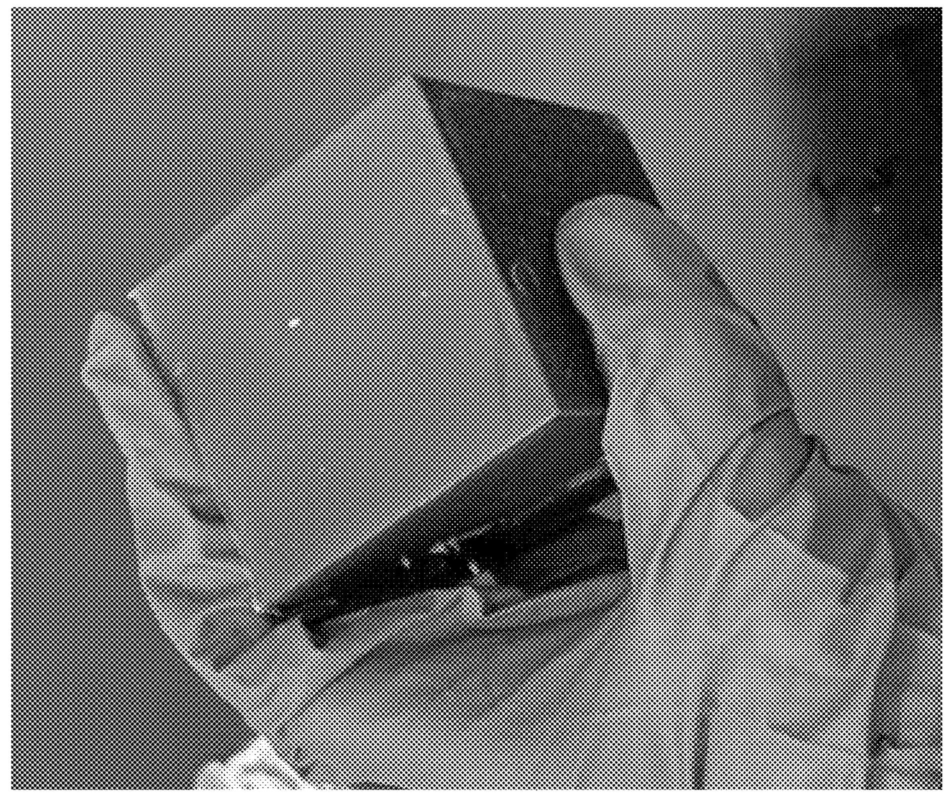

FIG. 2 shows Formulation 2 from Table 6 before and after thickening (i.e., the liquid to solid transition observed in Table 9) occurred at room temperature, indicating strong gelling. FIG. 3 shows Formulation 2 after it was kept in a water bath (120° F.) for 24 hours. The formulation was poured into plastic cups and sealed then immersed in the water bath. After 1 day, the sample was removed from the water bath, and the plastic cups removed, to show curing into a hard rigid material.

It is to be recognized that the disclosed drilling fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the well site 100 depicted generally in FIG. 1.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as concentration, temperatures, and so forth used in the present specification and associated claims are to be understood as being modified in all instances by the term "about." As used herein, the term "about" encompasses +/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Terms of orientation are used herein merely for purposes of convention and referencing and are not to be construed as limiting. However, it is recognized these terms could be used with reference to an operator or user.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A method comprising:

introducing into a wellbore within a subterranean formation a sealant composition consisting essentially of:

red mud;

wherein the red mud comprises from 20 weight percent (wt %) to 40 wt % of sodium, based on the total elemental composition of the red mud and wherein the red mud comprises a $Al_2O_3$ basis/$SiO_2$ basis of from about 1/1 to about 3/1, based on the total elemental composition of the red mud; and at least one epoxy resin; and, at least one curing agent;

allowing the sealant composition to cure to form a solidified sealant composition.

2. The method of claim 1, wherein the sealant composition is a lost circulation material (LCM) composition;

wherein the LCM composition is introduced into a zone of interest within the subterranean formation via the wellbore;

wherein the zone of interest is selected from the group consisting of a depleted zone, a zone of low pressure, a lost circulation zone, a fracture zone, and any combination thereof; and wherein the LCM composition is cured within the lost circulation zone.

3. The method of claim 1, wherein the sealant composition is a cementing composition;

wherein the cementing composition is introduced into an annulus between the wall of the wellbore and a casing disposed therein; and wherein the cementing composition is cured within the annulus.

4. The method of claim 1, wherein the red mud comprises particles, of which 80% by volume have an average particle size of less than 50 microns (μm);

and wherein the red mud is present in the cementing composition at from 0.1 wt % to 50 wt %, based on the total weight of the cementing composition.

5. The method of claim 1, wherein the at least one epoxy resin comprises a component selected from a group consisting of:

bisphenol-epichlorohydrin epoxy resins;

novolak epoxy resins;

compounds having formula (I):

$[(OC_2H_3)—CH_2—O]_x—R^1$, (I), wherein $R^1$ is a hydrocarbyl group comprising from 6 carbon atoms to 24 carbon atoms, and wherein x is ≥2;

derivatives thereof; and any combination thereof, and/or wherein the at least one epoxy resin is present in the sealant composition at from 20 weight percent (wt %) to 99 wt %, based on the total weight of the sealant composition.

6. The method of claim 1, wherein the epoxy resin portion further comprises a diluent, wherein the diluent comprises at least one component selected from the group consisting of:

compounds having formula (I):

$[(OC_2H_3)—CH_2—O]_x—R^1$, (I), wherein $R^1$ is a hydrocarbyl group comprising 2 carbon atoms to 5 carbon atoms, and wherein x is ≥2;

compounds having formula (II):

$(OC_2H_3)—CH_2—R^2$, (II), where $R^2$ is a hydrocarbyl group comprising 4 carbon atoms to 24 carbon atoms;

derivatives thereof; and any combination thereof, and/or wherein the diluent is present at from 1 weight percent (wt %) to 10 wt %, based on the total weight of the epoxy resin portion.

7. The method of claim 1, wherein the curing agent comprises at least one component selected from the group consisting of amines, polyamines, amine adducts, polyamine adducts, alkanolamines, polyetheramines, amides, polyamides, polyamide adducts, amidoamines, polyamidoamines, phenalkamine, imidazoles, and any combination thereof, and/or wherein the curing agent is present in the sealant composition at from 0.1 weight percent (wt %) to 30 wt %, based on the total weight of the sealant composition.

8. The method of claim 1, wherein the sealant composition comprises an emulsifier and/or a weighting agent; and wherein the emulsifier comprises a component selected from a group consisting of alkoxylated alkylphenols; alkoxylated phenols; alkylphenols; fatty acids; fatty amides; polyolefin amide alkenamines; lecithins; glycolic acid alkoxylate alkenyl ethers; glycols; phosphate esters; ethanolamines; N,N-bis(hydroxyethyl) fatty amides; derivatives thereof, and any combination thereof;

wherein the emulsifier is present in the sealant composition at from 0.1 weight percent (wt %) to 30 wt %, based on the total weight of the sealant composition;

wherein the weighting agent comprises a component selected from a group consisting of sand, barite, hematite, calcium carbonate, siderite, ilmenite, silica, manganese oxide, hausmannite, manganese tetraoxide, zinc oxide, zirconium oxide, fly ash, and any combination thereof, and/or wherein the weighting agent is present in the sealant composition at from 0.1 weight percent (wt %) to 40 wt %, based on the total weight of the sealant composition.

9. The method of claim 1, wherein the sealant composition has a thickening time at 68 degrees Fahrenheit (° F.) of from one (1) hour to ten (10) hours; and/or wherein the sealant composition has a setting time of four (4) hours to 40 hours at a temperature of 120° F.

10. The method of claim 1, wherein the method further comprises, prior to introducing the sealant composition, pre-mixing the components of the sealant composition.

11. The method of claim 1, wherein introducing the sealant composition comprises introducing at least one subterranean operation fluid, wherein the at least one subterranean operation fluid is selected from the group consisting of a drilling fluid, a drilling pill, a cementing slurry, and any combination thereof, wherein the at least one subterranean operation fluid, taken together, comprise each of the components of the sealant composition; and wherein each component of the sealant composition is comprised in the same subterranean operation fluid, or wherein at least two components of the sealant composition are comprised in at least two different subterranean operation fluids.

* * * * *